United States Patent
Sullivan et al.

(10) Patent No.: US 10,143,893 B2
(45) Date of Patent: Dec. 4, 2018

(54) GOLF BALLS HAVING CORE STRUCTURES WITH IRON-CONTAINING CENTERS

(71) Applicant: Acushnet Company, Fairhaven, MA (US)

(72) Inventors: Michael J. Sullivan, Old Lyme, CT (US); Mark L. Binette, Mattapoisett, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 15/593,678

(22) Filed: May 12, 2017

(65) Prior Publication Data

US 2017/0246510 A1   Aug. 31, 2017

Related U.S. Application Data

(63) Continuation-in-part of application No. 15/494,775, filed on Apr. 24, 2017, which is a continuation of
(Continued)

(51) Int. Cl.
  *A63B 37/06*   (2006.01)
  *A63B 37/00*   (2006.01)

(52) U.S. Cl.
  CPC ...... *A63B 37/0051* (2013.01); *A63B 37/0024* (2013.01); *A63B 37/0033* (2013.01); *A63B 37/0039* (2013.01); *A63B 37/0043* (2013.01); *A63B 37/0044* (2013.01); *A63B 37/0045* (2013.01); *A63B 37/0047* (2013.01); *A63B 37/0054* (2013.01); *A63B 37/0062* (2013.01); *A63B 37/0063* (2013.01); *A63B 37/0064* (2013.01); *A63B 37/0066* (2013.01); *A63B 37/0075* (2013.01); *A63B 37/0076* (2013.01);
(Continued)

(58) Field of Classification Search
  CPC ........... A63B 37/0055; A63B 37/0063; A63B 37/0066
  USPC .................................................. 473/373, 374
  See application file for complete search history.

(56) References Cited

U.S. PATENT DOCUMENTS

| 4,625,964 A | 12/1986 | Yamada |
| 5,048,838 A | 9/1991 | Chikaraishi et al. |

(Continued)

FOREIGN PATENT DOCUMENTS

| EP | 1861456 B1 | 2/2013 |
| WO | WO 2012/168442 A1 | 12/2012 |

*Primary Examiner* — Raeann Gorden
(74) *Attorney, Agent, or Firm* — Daniel W. Sullivan

(57) ABSTRACT

Multi-piece golf balls having a solid core and cover are provided. The ball contains a small, heavy inner core and surrounding outer core layer. The inner core preferably contains metal powder such as copper, steel, brass, tungsten, titanium, nickel, iron, tin, and bronze particles dispersed in a thermoset or thermoplastic polymeric matrix. For example, a polybutadiene rubber matrix may be used. In one preferred embodiment, the inner core contains elemental iron powder. Preferably, the particles have a weight average size in the range of about 10 μm to about 450 μm. In one embodiment, the outer surface of the inner core has a structure with projecting members. For example, the outer surface may contain multiple projecting ribs with gaps located between the ribs. The ball includes a cover surrounding the core structure. The cover may be multi-layered.

5 Claims, 6 Drawing Sheets

Related U.S. Application Data application No. 14/982,629, filed on Dec. 29, 2015, now Pat. No. 9,630,061, which is a continuation of application No. 14/170,737, filed on Feb. 3, 2014, now Pat. No. 9,220,946, which is a continuation-in-part of application No. 13/606,099, filed on Sep. 7, 2012, now Pat. No. 9,095,746.

(52) U.S. Cl.
CPC ...... *A63B 37/0091* (2013.01); *A63B 37/0092* (2013.01); *A63B 37/0097* (2013.01)

(56) References Cited

U.S. PATENT DOCUMENTS

| | | | |
|---|---|---|---|
| 5,104,126 A | 4/1992 | Gentiluomo | |
| 5,482,285 A | 1/1996 | Yabuki et al. | |
| 6,142,887 A | 11/2000 | Sullivan et al. | |
| 6,277,034 B1 | 8/2001 | Nesbitt et al. | |
| 6,293,877 B1 | 9/2001 | Boehm | |
| 6,398,667 B1 | 6/2002 | Lemons | |
| 6,494,795 B2 | 12/2002 | Sullivan | |
| 6,500,076 B1 | 12/2002 | Morgan et al. | |
| 6,692,380 B2 | 2/2004 | Sullivan et al. | |
| 6,756,436 B2 | 6/2004 | Rajagopalan et al. | |
| 6,773,364 B2 | 8/2004 | Sullivan et al. | |
| 6,986,717 B2 | 1/2006 | Morgan et al. | |
| 7,022,034 B2 | 4/2006 | Sullivan et al. | |
| 7,410,429 B1 | 8/2008 | Bulpett et al. | |
| 7,537,529 B2 | 5/2009 | Bulpett et al. | |
| 7,537,530 B2 | 5/2009 | Bulpett et al. | |
| 7,591,742 B2 | 9/2009 | Sullivan et al. | |
| 7,744,489 B2 * | 6/2010 | Sullivan ............. | A63B 37/0044 473/373 |
| 7,744,490 B2 | 6/2010 | Sullivan et al. | |
| 7,815,526 B2 | 10/2010 | Sullivan et al. | |
| 7,901,301 B2 | 3/2011 | Morgan et al. | |
| 7,946,934 B2 | 5/2011 | Sullivan et al. | |
| 8,033,933 B2 | 10/2011 | Sullivan et al. | |
| 8,137,214 B2 | 3/2012 | Sullivan et al. | |
| 8,137,216 B2 | 3/2012 | Sullivan et al. | |
| 8,152,655 B2 | 4/2012 | Comeau et al. | |
| 8,268,920 B2 | 9/2012 | Prusty et al. | |
| 8,460,126 B2 | 6/2013 | Sullivan et al. | |
| 9,220,946 B2 * | 12/2015 | Sullivan ............. | A63B 37/0054 |
| 9,526,949 B2 | 12/2016 | Mikura et al. | |
| 9,630,061 B2 * | 4/2017 | Sullivan ............. | A63B 37/0054 |
| 2001/0027140 A1 | 10/2001 | Bellinger et al. | |
| 2010/0099517 A1 | 4/2010 | Comeau et al. | |
| 2010/0144466 A1 | 6/2010 | Sullivan et al. | |
| 2011/0275456 A1 | 11/2011 | Sullivan et al. | |
| 2011/0312441 A1 | 12/2011 | Sullivan et al. | |
| 2012/0122610 A1 | 5/2012 | Sullivan et al. | |

\* cited by examiner

GOLF BALLS HAVING CORE STRUCTURES WITH IRON-CONTAINING CENTERS

CROSS-REFERENCE TO RELATED APPLICATIONS

This application is a continuation-in-part of co-pending, co-assigned U.S. patent application Ser. No. 15/494,775 having a filing date of Apr. 24, 2017, which is a continuation of co-assigned U.S. patent application Ser. No. 14/982,629 having a filing date of Dec. 29, 2015, now issued as U.S. Pat. No. 9,630,061 with an issue date of Apr. 25, 2017, which is a continuation of co-assigned U.S. patent application Ser. No. 14/170,737 having a filing date of Feb. 3, 2014, now issued as U.S. Pat. No. 9,220,946 with an issue date of Dec. 29, 2015, which is a continuation-in-part of co-assigned U.S. patent application Ser. No. 13/606,099 having a filing date of Sep. 7, 2012, now issued as U.S. Pat. No. 9,095,746 with an issue date of Aug. 4, 2015, the entire disclosures of which are hereby incorporated by reference.

BACKGROUND OF THE INVENTION

Field of the Invention

The present invention generally relates to multi-piece golf balls having a solid core and cover. Particularly, the ball contains a relatively small, heavy inner core and surrounding outer core layer. The inner core is preferably formed from a thermoset or thermoplastic composition containing metal material. In one embodiment, the outer surface of the inner core has a structure that includes projecting members. A multi-layered cover comprising inner and outer cover layers may be disposed about the core structure.

Brief Review of the Related Art

Multi-piece, solid golf balls having a solid inner core protected by a cover are used today by recreational and professional golfers. The golf balls may have single-layered or multi-layered cores. Normally, the core layers are made of a highly resilient natural or synthetic rubber material such as styrene butadiene, polybutadiene, polyisoprene, or highly neutralized ethylene acid copolymers (HNPs). The covers may be single or multi-layered and made of a durable material such as HNPs, polyamides, polyesters, polyurethanes, or polyureas. Manufacturers of golf balls use different ball constructions (for example, three-piece, four-piece, and five-piece balls) to impart specific properties and features to the balls.

The core is the primary source of resiliency for the golf ball and is often referred to as the "engine" of the ball. The resiliency or coefficient of restitution ("COR") of a golf ball (or golf ball component, particularly a core) means the ratio of a ball's rebound velocity to its initial incoming velocity when the ball is fired out of an air cannon into a rigid plate. The COR for a golf ball is written as a decimal value between zero and one. A golf ball may have different COR values at different initial velocities. The United States Golf Association (USGA) sets limits on the initial velocity of the ball so one objective of golf ball manufacturers is to maximize the COR under these conditions. Balls (or cores) with a high rebound velocity have a relatively high COR value. Such golf balls rebound faster, retain more total energy when struck with a club, and have longer flight distances as opposed to balls with lower COR values. Ball resiliency and COR properties are particularly important for long distance shots. For example, balls having high resiliency and COR values tend to travel a far distance when struck by a driver club from a tee. The spin rate of the ball also is an important property. Balls having a relatively high spin rate are particularly desirable for relatively short distance shots made with irons and wedge clubs. Professional and highly skilled recreational golfers can place a back-spin on such balls more easily. By placing the right amount of spin and touch on the ball, the golfer has better control over shot accuracy and placement. This is particularly important for approach shots near the green and helps improve scoring performance.

Over the years, golf ball manufacturers have looked at adjusting the density or specific gravity among the multiple layers of the golf ball to control its spin rate. In general, the total weight of a golf ball needs to conform to weight limits set by the United States Golf Association ("USGA"). Although the total weight of the golf ball is mandated, the distribution of weight within the ball can vary. Redistributing the weight or mass of the golf ball either towards the center of the ball or towards the outer surface of the ball changes its flight and spin properties.

For example, the weight can be shifted towards the center of the ball to increase the spin rate of the ball as described in Yamada, U.S. Pat. No. 4,625,964. In the '964 patent, the core composition preferably contains 100 parts by weight of polybutadiene rubber; 10 to 50 parts by weight of zinc acrylate or zinc methacrylate; 10 to 150 parts by weight of zinc oxide; and 1 to 5 parts by weight of peroxide as a cross-linking or curing agent. The inner core has a specific gravity of at least 1.50 in order to make the spin rate of the ball comparable to wound balls. The ball further includes a cover an intermediate layer disposed between the core and cover, wherein the intermediate layer has a lower specific gravity than the core.

Chikaraishi et al., U.S. Pat. No. 5,048,838 discloses a three-piece golf ball containing a two-piece solid core and a cover. The inner core has a diameter in the range of 15-25 mm, a weight of 2-14 grams, a specific gravity of 1.2 to 4.0, and a hardness of 55-80 JISC. The specific gravity of the outer core layer is less than the specific gravity of the inner core by 0.1 to 3.0. less than the specific gravity of the inner core. The inner and outer core layers are formed from rubber compositions.

Gentiluomo, U.S. Pat. No. 5,104,126 discloses a three-piece ball with a dense inner core made of steel, lead, brass, zinc, copper, and a filled elastomer, wherein the core has a specific gravity of at least 1.25. The inner core is encapsulated by a lower density syntactic foam composition, and the core construction is encapsulated by an ionomer cover.

Yabuki et al., U.S. Pat. No. 5,482,285 discloses a three-piece golf ball having an inner core and outer core encapsulated by an ionomer cover. The specific gravity of the outer core is reduced so that it falls within the range of 0.2 to 1.0. The specific gravity of the inner core is adjusted so that the total weight of the inner/outer core falls within a range of 32.0 to 39.0 g.

Nesbitt and Binette, U.S. Pat. No. 6,277,934 disclose a non-wound, multi-piece golf ball containing a spherical metal core component having a specific gravity of about 1.5 to about 19.4; and an outer core layer disposed about said spherical metal core component, wherein the core layer has a specific gravity of less than 1.2. The metal core is preferably contains a metal selected from steel, titanium, brass, lead, tungsten, molybdenum, copper, nickel, iron, and combinations thereof. Polybutadiene rubber compositions containing metallic powders can be used to form the core. The core assembly preferably has a coefficient of restitution of at least 0.730.

Sullivan, U.S. Pat. No. 6,494,795 discloses a golf ball comprising an inner core having a specific gravity of greater than 1.8 encased within a first mantle surrounding the inner core. A portion of the first mantle comprises a low specific gravity layer having a specific gravity of less than 0.9. The core may be made from a high density metal or from metal powder encased in a polymeric binder. High density metals such as steel, tungsten, lead, brass, bronze, copper, nickel, molybdenum, or alloys may be used. The mantle layer surrounding the inner core may be made from a thermoset or thermoplastic material such as epoxy, urethane, polyester, polyurethane, or polyurea.

Sullivan, U.S. Pat. No. 6,692,380 discloses a golf ball comprising an inner core having a specific gravity of at least 3, a diameter of about 0.40 to about 0.60 inches and preferably comprises a polymeric matrix of polyurethane, polyurea, or blends thereof. The outer core may be made from a polybutadiene rubber. The specific gravity of the compositions may be adjusted by adding fillers such as metal powder, metal alloy powder, metal oxide, metal stearates, particulates, and carbonaceous material.

Morgan and Jones, U.S. Pat. No. 6,986,717 discloses a golf ball containing a high-specific gravity central sphere encapsulated in a soft and resilient shell, preferably formed of a polybutadiene rubber. This shell is subsequently wound with thread that is preferably elastic to form a wound core. This wound core is then covered with a cover material such as balata, gutta percha, an ionomer or a blend of ionomers, polyurethane, polyurea-based composition, and epoxy-urethane-based compositions. The sphere is formed of metallic powder and a thermoset or thermoplastic binder material. Metals such as tungsten, steel, brass, titanium, lead, zinc, copper, bismuth, nickel, molybdenum, iron, bronze, cobalt, silver, platinum, and gold can be used. Preferably, the metal sphere has a specific gravity of at least 6.0 and a diameter of less than 0.5 inches.

Although some conventional multi-layered core constructions are generally effective in providing high resiliency golf balls, there is a continuing need for improved core constructions in golf balls. Particularly, it would be desirable to have multi-layered core constructions with selective specific gravities and mass densities to provide the ball with good flight distance along with spin control. The present invention provides core constructions and golf balls having such properties as well as other advantageous features and benefits.

SUMMARY OF THE INVENTION

The present invention provides a golf ball comprising an inner core (center), outer core layer, and cover. The multi-layered core assembly includes: i) an inner core layer having a center and outer surface and comprising a metal material, wherein the outer surface contains elements extending outwardly; and ii) an outer core layer comprising a thermoset or thermoplastic composition. The inner core preferably has a diameter in the range of about 0.100 to about 1.100 inches; and the outer core layer preferably has a thickness in the range of about 0.200 to about 0.800 inches. A cover having at least one layer is disposed about the multi-layered core assembly.

The inner core has a specific gravity ($SG_{inner}$), preferably about 1.60 to about 6.25 g/cc, and a center hardness ($H_{inner\ core\ center}$), preferably in the range of about 10 to about 80 Shore C. In one version, the inner core has a diameter in the range of about 0.100 to about 0.500 inches, more preferably about 0.30 to about 0.80 inches. Furthermore, the outer core layer has a specific gravity ($SG_{outer\ core}$), preferably about 0.60 to about 4.10 g/cc and outer surface hardness ($H_{outer\ surface\ of\ OC}$), preferably in the range of about 65 to about 96 Shore C so there is a positive hardness gradient across the core assembly. In one version, the outer core layer has a thickness in the range of about 0.250 to about 0.750 inches. Preferably, the $SG_{inner}$ is greater than the $SG_{outer}$.

In one preferred embodiment, the projecting members of the outer core are spaced apart and there are gaps between the projections. The projections can be uniformly or randomly spaced apart and can have various shapes and dimensions. In one embodiment, the outer core layer is disposed about the inner core, whereby the outer core material fills the gaps between the projecting members.

The hardness levels of the different layers in the golf ball may vary. For example, in one version, the inner core layer has an outer surface hardness ($H_{inner\ core\ surface}$) and a center hardness ($H_{inner\ core\ center}$), wherein the $H_{inner\ core\ surface}$ is greater than the $H_{inner\ core\ center}$ to provide a positive hardness gradient. Meanwhile, the outer core layer has an outer surface hardness ($H_{outer\ surface\ of\ OC}$) and a midpoint hardness ($H_{midpoint\ of\ OC}$), wherein the $H_{outer\ surface\ of\ OC}$ is greater than the ($H_{midpoint\ of\ OC}$), to provide a positive hardness gradient. In another example, the inner core layer has an outer surface hardness ($H_{inner\ core\ surface}$) and a center hardness ($H_{inner\ core\ center}$), wherein the $H_{inner\ core\ surface}$ is the same or less than the $H_{inner\ core\ center}$ to provide a zero or negative hardness gradient; while the outer core layer has a positive hardness gradient.

The inner core may contain any suitable metal such as copper, steel, brass, tungsten, titanium, aluminum, magnesium, molybdenum, cobalt, nickel, iron, tin, bronze, silver, gold, and platinum, and oxides, and alloys and combinations thereof. The inner core may further comprise a thermoset or thermoplastic polymer matrix, and the metal filler may be dispersed therein. For example, a thermoset material such as a polybutadiene, ethylene-propylene, polyisoprene, styrene-butadiene, or butyl rubber composition may be used. Thermoplastic polymers such as partially and highly-neutralized olefin-based acid copolymer ionomer and non-ionomer materials also may be used. The outer core layer also may be made from a wide variety of thermoset and thermoplastic materials. Also, the golf ball may have a variety of cover structures. For example, the cover may have a single layer or multiple layers and be formed from a thermoplastic or thermoset composition. Suitable materials that can be used to form the cover layers include, for example, ethylene acid copolymer ionomers, polyesters, polyamides, polyurethanes, and polyureas.

BRIEF DESCRIPTION OF THE DRAWINGS

The novel features that are characteristic of the present invention are set forth in the appended claims. However, the preferred embodiments of the invention, together with further objects and attendant advantages, are best understood by reference to the following detailed description in connection with the accompanying drawings in which:

DETAILED DESCRIPTION OF THE INVENTION

Golf Ball Constructions

Golf balls having various constructions may be made in accordance with this invention. For example, golf balls having three-piece, four-piece, and five-piece constructions with single or multi-layered cover materials may be made. The term, "layer" as used herein means generally any spherical portion of the golf ball. More particularly, in one version, a three-piece golf ball having a dual-core and cover is made. The dual-core includes an inner core (center) and surrounding outer core layer. In another version, a four-piece golf ball comprising a dual-core and dual-cover (inner cover and outer cover layers) is made. In yet another construction, a four-piece or five-piece golf ball having a multi-layered core; an intermediate (casing) layer, and cover layer(s) may be made. As used herein, the term, "intermediate layer" means a layer of the ball disposed between the core and cover. The intermediate layer also may be referred to as a casing or mantle layer. The diameter and thickness of the different layers along with properties such as hardness and compression may vary depending upon the construction and desired playing performance properties of the golf ball.

Figure 1:
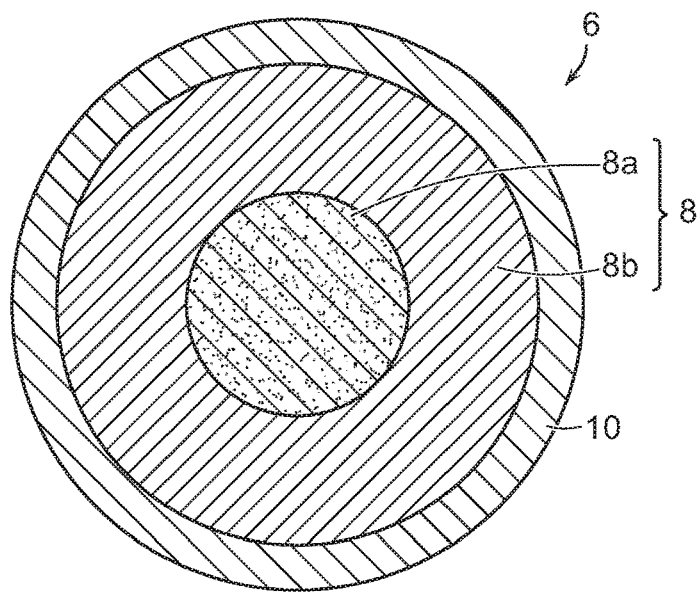
FIG. 1 is a cross-sectional view of a three-piece golf ball having a multi-layered core and single-layered cover according to the present invention.
Figure 2:
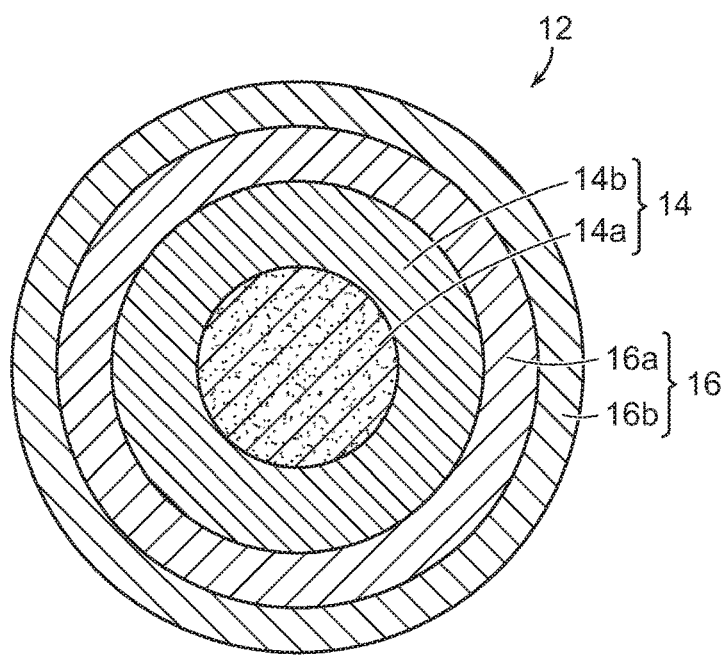
FIG. 2 is a cross-sectional view of a four-piece golf ball having a multi-layered core and dual-layered cover according to the present invention.
Figure 3:
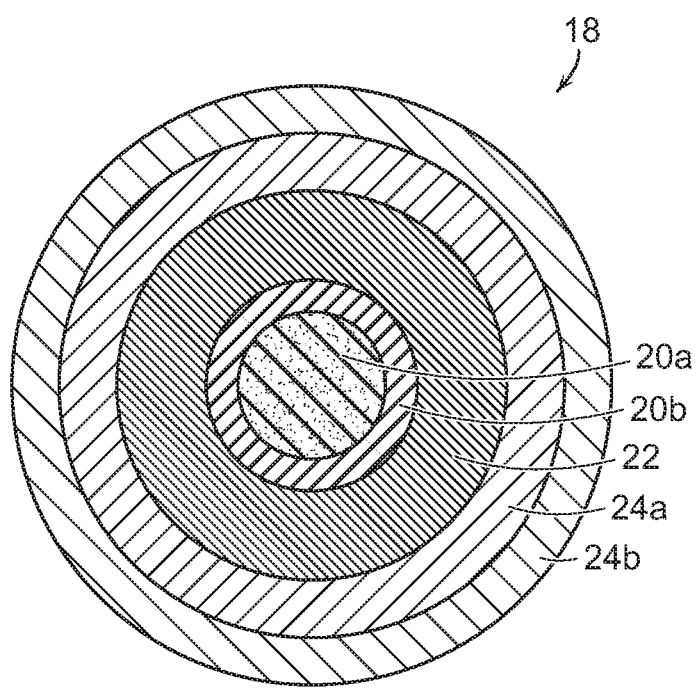
FIG. 3 is a cross-sectional view of a five-piece golf ball having a multi-layered core, casing layer, and dual-layered cover according to the present invention.

Referring to FIG. 1, one version of a golf ball that can be made in accordance with this invention is generally indicated at (6). The ball (6) contains a multi-layered core (8) having an inner core (center) (8a) and outer core layer (8b) surrounded by a single-layered cover (10). The inner core (8a) is relatively small in volume and generally has a diameter within a range of about 0.10 to about 1.10 inches. More particularly, the inner core (8a) preferably has a diameter size with a lower limit of about 0.15 or 0.25 or 0.35 or 0.45 or 0.55 inches and an upper limit of about 0.60 or 0.70 or 0.80 or 0.90 inches. In one preferred version, the diameter of the inner core (8a) is in the range of about 0.025 to about 0.080 inches, more preferably about 0.030 to about 0.075 inches. Meanwhile, the outer core layer (8b) generally has a thickness within a range of about 0.010 to about 0.250 inches and preferably has a lower limit of 0.010 or 0.020 or 0.025 or 0.030 inches and an upper limit of 0.070 or 0.080 or 0.100 or 0.200 inches. In one preferred version, the outer core layer (8b) has a thickness in the range of about 0.040 to about 0.170 inches, more preferably about 0.060 to about 0.150 inches. Referring to FIG. 2, in another version, the golf ball (12) contains a dual-core (14) having an inner core (center) (14a) and outer core layer (14b). The dual-core (14) is surrounded by a multi-layered cover (16) having an inner cover layer (16a) and outer cover layer (16b). In yet another version, as shown in FIG. 3, the golf ball (18) contains an inner core (center) (20a) and outer core layer (20b). The dual-core (20) is surrounded by a casing layer (22) and a multi-layered cover having an inner cover layer (24a) and outer cover layer (24b).

Golf balls made in accordance with this invention can be of any size, although the USGA requires that golf balls used in competition have a diameter of at least 1.68 inches. For play outside of United States Golf Association (USGA) rules, the golf balls can be of a smaller size. Normally, golf balls are manufactured in accordance with USGA requirements and have a diameter in the range of about 1.68 to about 1.80 inches. In general, the multi-layer core structure has an overall diameter within a range having a lower limit of about 1.00 or 1.20 or 1.30 or 1.40 inches and an upper limit of about 1.58 or 1.60 or 1.62 or 1.66 inches, and more preferably in the range of about 1.3 to 1.65 inches. In one embodiment, the diameter of the core assembly is in the range of about 1.45 to about 1.62 inches.

As discussed further below, various compositions may be used to make the dual-core structures of the golf balls of this invention. The golf balls may contain certain fillers to adjust the specific gravity and weight of the core layers as needed. In general, the inner core (center) has a specific gravity within a range having a lower limit of about 1.18 or 1.50 or 2.00 or 2.50 g/cc and an upper limit of about 3.00 or 3.50 or 4.00 or 4.50 or 5.00 g/cc. In a preferred embodiment, the inner core has a specific gravity of about 1.20 to about 3.50 g/cc, more preferably about 1.25 to about 3.00 g/cc. Meanwhile, the outer core layer preferably has a relatively low specific gravity. The outer core layer generally has a specific gravity within a range having a lower limit of about 0.080 or 0.100 or 0.400 or 0.600 or 0.800 g/cc and an upper limit of about 1.00 or 1.10 or 1.20 g/cc. The amount of fillers used in the compositions is adjusted so the weight of the golf ball does not exceed limits set by USGA rules. The USGA has established a maximum weight of 45.93 g (1.62 ounces). For play outside of USGA rules, the golf balls can be heavier. In one preferred embodiment, the weight of the multi-layered core is in the range of about 28 to about 38 grams.

Core Structure—Geometric Projections and Thickness

As shown in FIGS. 1-3, in some embodiments, the inner core has a substantially spherical shape and uniform thickness. In this version, the inner core includes a geometric center and outer surface that is substantially free of any projections or extending members. In these embodiments, the inner core has a substantially uniform thickness and the outer surface has a substantially smooth surface.

Referring to FIGS. 4 to 15, in other embodiments, the inner core structure has a non-uniform thickness and/or contains projecting members. These extending members on the outer surface of the core may be arranged in any suitable geometric pattern. For example, the extending members may be arranged in a grid or lattice; or a series of rows and raised columns. These extending members may be in the form of ridges, bumps, nubs, hooks, juts, ribs, segments, brambles, ribs, spines projections, points, protrusions, and the like. The projections on the outer surface may have any suitable shape and dimensions, and they may be arranged randomly or in a geometric order. For example, the projections may have a circular, oval, triangular, square, rectangular, pentagonal, hexagonal, heptagonal, or octagonal. Conical-shaped projections also may be used. The projections may be arranged in linear or non-linear patterns such as arcs and curves. The projections may be configured so there are gaps or channels located between them. The outer surface of inner core also may contain depressions, cavities, and the like. These recessed areas can be arranged so the outer surface has a series of peaks and valleys.

Suitable projecting members and various designs, patterns, and outlays of the members are disclosed in Sullivan et al., U.S. Pat. Nos. 8,137,216 and 8,033,933; Morgan et al., U.S. Pat. No. 7,901,301; Sullivan et al., U.S. Pat. Nos. 7,022,034 and 6,773,364; Rajagopalan et al., U.S. Pat. No. 6,939,907; and Boehm, U.S. Pat. No. 6,293,877, the disclosures of which are hereby incorporated by reference.

Figure 6:
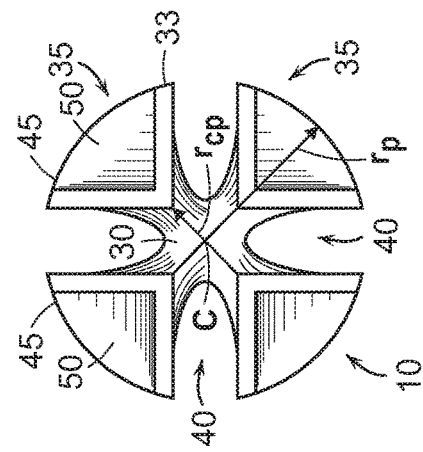
FIG. 6 is a plan view along Arrow 4 of the inner core of FIG. 5 according to the present invention.
Figure 5:
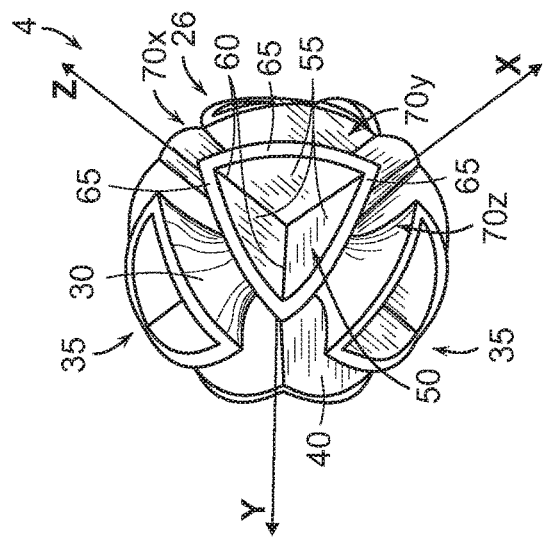
FIG. 5 is a perspective view of the inner core of the golf ball shown in FIG. 4.
Figure 4:
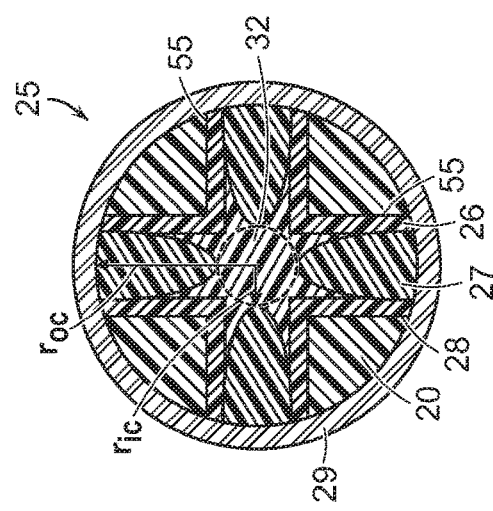
FIG. 4 is a cross-sectional view of a three-piece golf ball showing an inner core with projecting members, an outer core, and a cover according to the present invention.

More particularly, referring to FIGS. 4-6, the golf ball (25) includes an inner core (26) an outer core (27, 28), a cover (29) (shown without dimples). The inner core (26) includes a three-dimensional outer surface (30), a center C, a central portion (32), and a plurality of projections (35). The central portion (32) and projections (35) are integrally formed, so that the inner core is a single piece. The outer core includes a first section (27) and a second section (28). The first section (27) fills the gaps (40) around the projections (35), and is disposed between the side walls (55) of adjacent projections (35). It is preferred that the diameter of the core which includes the inner core and the outer core is between about 1.00 inches and about 1.64 inches for a ball having a diameter of 1.68 inches. The second section (28) fills the recesses (50) of each projection (35) and is disposed between the side walls (55) of a single projection (35). The outer core sections (27, 28) are formed so that the outer core terminates flush with the free end (45) of each projection (35). The outer core has a substantially spherical outer surface. The cover (29) is formed about the inner core (26) and the outer core sections (27, 28) so that both the inner and outer cores abut the cover. The formation of the golf ball starts with forming the inner core (26). The inner core (26), outer core sections (27, 28), and the cover (29) are formed by compression molding, injection molding, or casting.

As shown in FIG. 5, each recess (50) is formed by three integral side walls (55). Each of the side walls (55) is shaped like a flat quarter circle. The quarter circle includes two straight edges (60) joined by a curved edge (65). In each projection (35), each of the side walls (55) is joined at the straight edges (60). The curved edges (65) of each of the projections allow the inner core to have a spherical shape. With reference to a three-dimensional Cartesian Coordinate system, there are perpendicular x, y, and z axes, respectively that form eight octants. There are eight projections (35) with one in each octant of the coordinate system, so that each of the projections (35) forms an octant of the skeletal sphere. Thus, the inner core is symmetrical. The gaps (40) define three perpendicular concentric rings $70_x$, $70_y$, and $70_z$. The subscript for the reference number (70) designates the central axis of the ring about which the ring circumscribes.

In FIG. 6, the outer surface (33) of the inner core (26) is defined by radial distances from the center C. At least two of the radial distances about the outer surface are different. The central portion (32) has a radius, designated by the arrow $r_{cp}$, that extends from the core center C to the outer surface of the central portion. The central portion 32 is solid in this embodiment.

As shown in FIGS. 5 and 6, each of the projections (35) extends radially outwardly from the central portion (32), and the projections (35) are spaced from one another to define gaps (40) there between. The projections (35) are shaped so that the inner core (26) is substantially spherically symmetrical. Each projection (35) has an enlarged free end (45) and a substantially conical shape. Each free end (45) includes an open recess (50). Each projection (35) has a radius, designated by the arrow $r_p$, that extends from the core center C to the outer surface (33) at the free end (45). The projection radii $r_p$ differ from the central portion radius $r_{cp}$.

Figure 7:
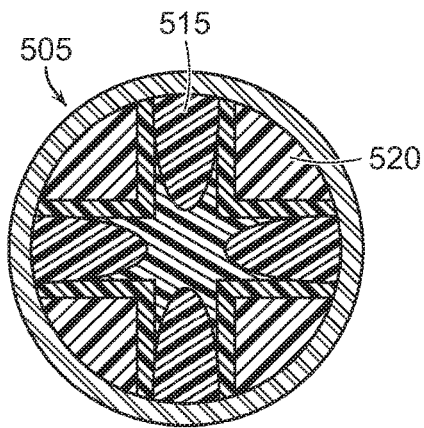
FIG. 7 is a cross-sectional view of another embodiment of a three-piece ball according to the present invention.
Figure 8:
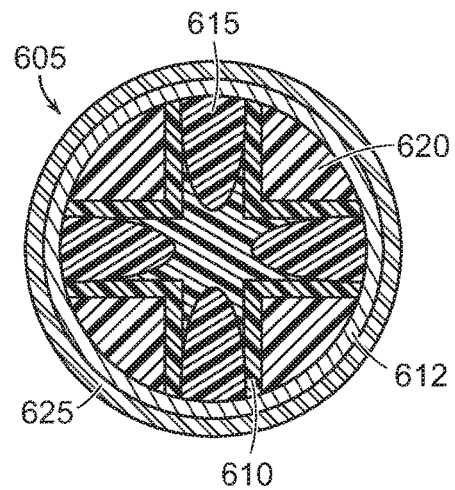
FIG. 8 is a cross-sectional view of another embodiment of a four-piece ball showing an inner core with projecting members, an outer core, an inner cover, and an outer cover according to the present invention.
Figure 9:
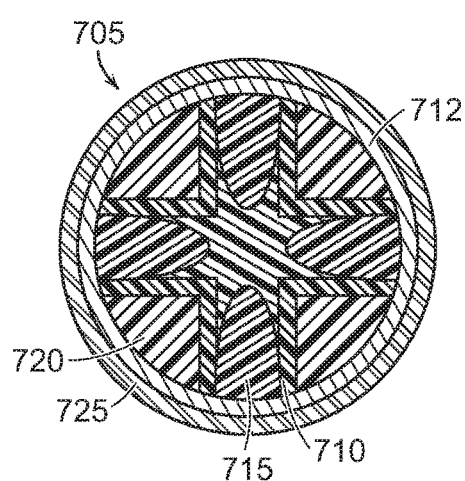
FIG. 9 is a cross-sectional view of another embodiment of a four-piece ball according to the present invention.
Figure 10:
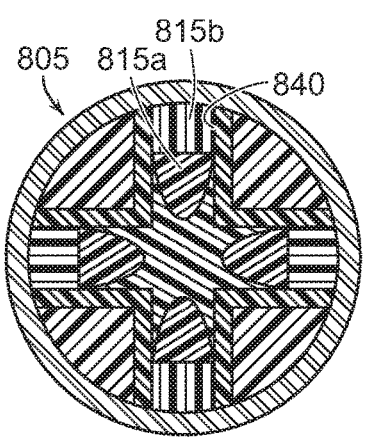
FIG. 10 is a cross-sectional view of another embodiment of a three-piece ball according to the present invention.

In FIG. 7, another embodiment of the golf ball (505) is shown. The golf ball (505) includes an outer core with a first section (515) and a second section (520). The first section (515) and second section (520) are formed of two materials with different material properties. Referring to FIG. 8, another embodiment of a golf ball (605) is shown. The golf ball (605) includes an intermediate (casing) layer (612) disposed between the cover (625) and the core structure (inner core 610 and outer cores 615 and 620). The intermediate layer (612) is formed of either outer core material, cover material, or a different material. The first section (615) and second section (620) of the outer core may be formed of materials with the same material properties. However, in another embodiment, the outer core sections (615, 620) are formed of different materials. The intermediate layer (612) covers the inner core (610), outer core (615 and 620), and forms a continuous layer beneath the cover (625). Another embodiment of a golf ball (705) is shown in FIG. 9. The golf ball (705) includes an intermediate (casing) layer (712) disposed between the cover (725) and the core structure (inner core 710 and outer cores 715 and 720). The intermediate layer (712) is formed of either outer core material, cover material or a different material. The first section (715) and second section (720) of the outer core are formed of materials with different material properties. The intermediate layer (712) covers the inner core (710), outer core (715 and 720), and forms a continuous layer beneath the cover (725). In FIG. 10, another embodiment of the golf ball (805) is shown. The golf ball (805) includes an outer core with a multi-material first section (815a and 815b) disposed within the gaps (840). The different portions (815a, 815b) of the first section of the outer core are formed of two materials with different material properties. In other embodiments, additional layers may be added to those mentioned above or the existing layers may be formed by multiple materials.

Figures 11, 12:
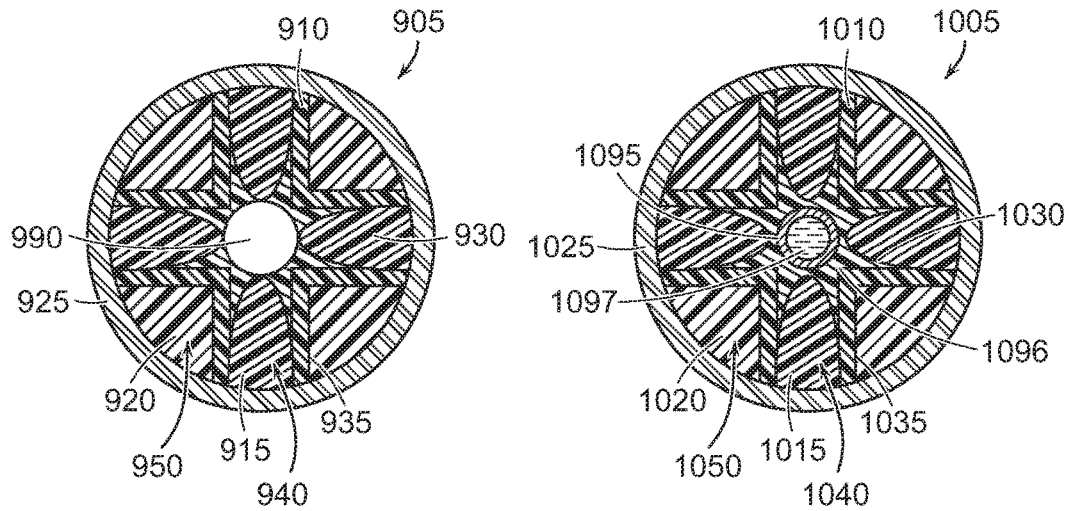
FIG. 11 is a cross-sectional view of another embodiment of a three-piece ball according to the present invention.
FIG. 12 is a cross-sectional view of another embodiment of a three-piece ball according to the present invention.

Turning to FIG. 11, the golf ball (905) includes an inner core (910) including a central portion (930) and plurality of outwardly radially extending projections (935). The inner core (910) includes a hollow central portion (930) that defines a chamber (990) therein. The outer core is formed from a first section (915) disposed within the gaps (940), and a second section (920) disposed within the recesses (95. The first and second sections (915, 920) may be formed of a material with the same material properties. The cover section (925) surrounds the outer core (915, 920). The hollow central portion (930) reduces the volume of the inner core (910) material. In other embodiment, the central portion (930) may include a fluid.

Referring to FIG. 12, the golf ball (1005) includes an inner core (1010) and outer core (1015, 1020). The inner core (1010) includes a central portion (1030) and plurality of outwardly radially extending projections (1035). The central portion (1030) is hollow and surrounds a fluid-filled center (1095). The fluid-filled center (1095) is formed of an envelope (1096) containing a fluid (1097). The outer core is formed from a first section (1015) disposed within the gaps (1040), and a second section (1020) disposed within the recesses (1050). The first and second sections (1020, 1050) may be formed of a material with the same material properties. The cover material (1025) surrounds the inner and outer cores. In FIG. 12, the inner core (1020) includes a center (1095). When the center (1095) is fluid-filled, the center (1095) is formed first and then the inner core (1020) is molded around the center. Conventional molding techniques can be used for this operation. Then, the outer core (1015, 1020) and cover (1025) are formed thereon, as discussed above.

Figure 13:
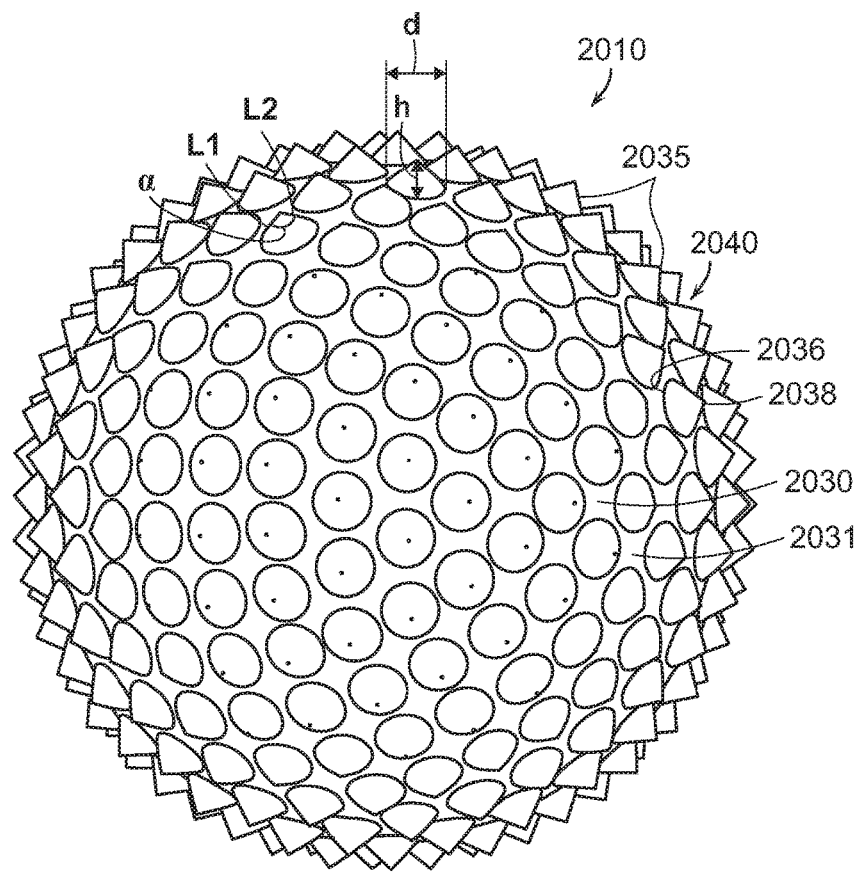
FIG. 13 is a perspective view of another embodiment of the inner core according to the present invention.

Another embodiment of an inner core (2010) is shown in FIG. 13. The inner core (2010) includes a spherical central portion (2030) having an outer surface (2031), and a plurality of projections (2035) extending radially outwardly from the central portion (2030). The projections (2035) include a base (2036) adjacent the outer surface (2031) and a pointed free-end (2038). The projections (2035) are substantially conical and taper from the base (2036) to the pointed free-end (2038). It is preferred that the bases cover greater than about 15% of the outer surface. More preferably, the bases should cover greater than about 50% of the outer surface. Most preferably, the bases should be circular in shape and cover greater than about 80% of the outer surface and less than about 85%. As a result, the projections (2035) are spaced from one another and the area of the outer surface (2031) between each projection base (2036) is less than the area of each base. The projections (2035) are conical and configured so that the free ends (2038) of the projections form a spheroid. The base can have other shapes, such as polygons. Examples of polygon shapes that can be used for the base are triangles, pentagons, and hexagons. In addition, instead of the projections having a circular cross-section they can have other cross-sectional shapes such as square.

The projections further include a base diameter, designated by the letter d, and a projection height, designated by the letter h. It is preferred that the base diameter d is greater than or equal to the projection height h. This allows an included angle α between two diametrically opposed sides of the projection, designated L1 and L2, to be about 60° or more. More preferably, the angle α is about 90° or more and most preferably the angle α is about 135°. This allows a simple mold to be used from which the core can be extracted. To form a golf ball with inner core (2010), an outer core, as discussed above, is disposed around the inner core (2010) so that the outer core material is disposed within the gaps (2040) and the outer surface of the outer core is substantially spherical. The materials for the inner and outer cores are as discussed above. Then, the cover is formed thereon. The outer surface of the inner core has non-uniform radial distances from the center to various locations on the outer surface due to the conical projections (2035).

Figure 15:
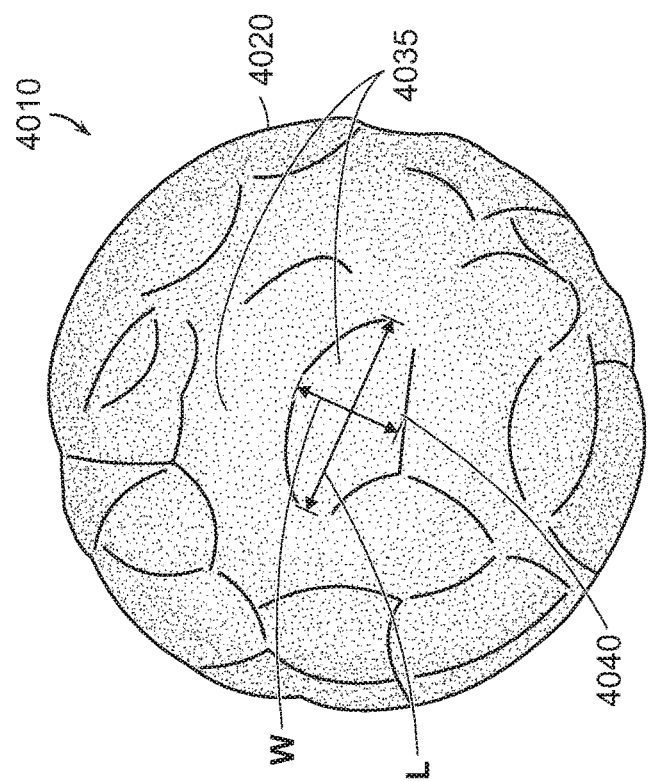
FIG. 15 is a perspective view of another embodiment of the inner core according to the present invention.
Figure 14:
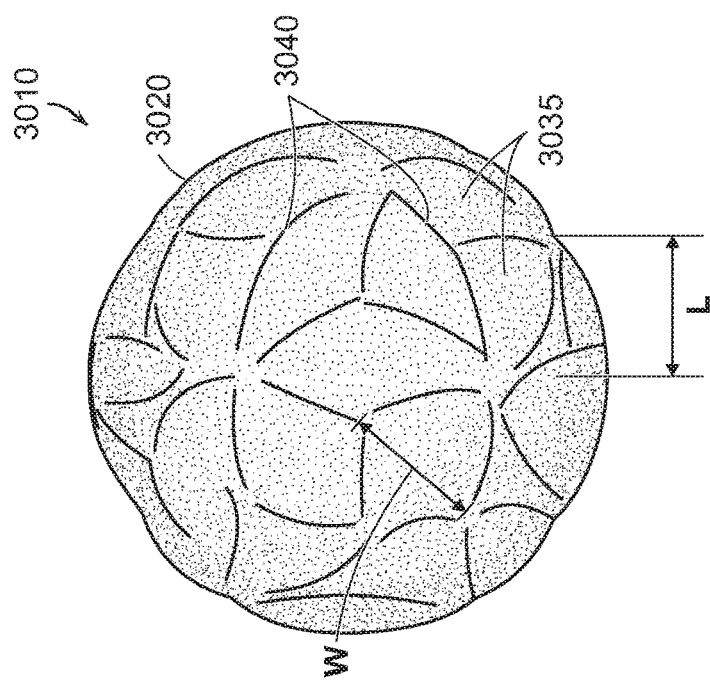
FIG. 14 is a perspective view of another embodiment of the inner core according to the present invention.

In FIGS. 14-15, different inner core (3010, 4010) structures are shown. In FIG. 14, the outer surface (3020) of the inner core includes a plurality of projections (3035) formed so that gaps (3040) are formed surrounding each projection and between projections. Each projection includes a maximum length, which is the longest length of the projection, designated L. Each projection also includes a maximum width, which is the widest width of the projection, designated W. The surface of the projection is curved along the length L and width W. A substantial number of projections have the maximum length greater than the maximum width so that the projections are elongated. To form a golf ball, an outer core, as discussed above, is disposed around the inner core (3010) so that the outer core material is disposed within the gaps. The outer core material forms a substantially spherical surface. The materials for the inner and outer cores are as discussed above. Then, a cover is formed thereon. The outer surface of the inner core has non-uniform radial distances from the center due to the projections and the indentations. In this embodiment, in order to form the outer surface of this inner core, the first, second and third surfaces are formed by rotation of a wave form about first, second and third axes, respectively. These axii are the x-, y- and z-axii in a Cartesian Coordinate System. The wave form used is sine wave. However, other wave forms can be used including, but not limited to, cosine or saw-tooth wave forms.

In FIG. 15, the outer surface (4020) of the inner core (4010) includes a plurality of projections (4035) formed so that gaps (4040) are formed surrounding each projection and between projections. Each projection includes a maximum length, which is the longest length of the projection, designated L. Each projection also includes a maximum width, which is the widest width of the projection, designated W. The surface of the projection is curved along the length L and width W. A substantial number of projections have the maximum length greater than the maximum width so that the projections are elongated. In this embodiment, in order to form the outer surface of this inner core, the first, second, and third surfaces are formed as discussed above, and a fourth surface that is formed by rotating the wave form about a fourth axis that is about 45° from the first and second axii. The surface of the inner core (4020) is formed by the intersection of the first, second, third and fourth surfaces. Any number of surfaces greater than three can be used to create different outer surface geometries for the inner core. Furthermore, different axii can also be used.

Core Structure—Surface Patterns

As described above, the surface of the core can have various structures. In another embodiment, the core can have surface patterns. For example, the core assembly of this invention can have a surface pattern defined by one or more bands on the surface of the layer that may be channels and/or raised beads. The bands may have uniform or variable width and depth/height either within the same band or between bands. The bands may be linear or curved and may or may not fully circumscribe the core. In one embodiment, these channels and/or ridges (hills and valleys) may be combined with the "projections" or other non-uniform surface features of the core as described above.

The channels on the core surface may be straight or curved, may or may not circumscribe the golf ball. The channels may also be discontinuous. The channels may or may not intersect other channels. They may cover as much of the ball surface as desired, up to virtually 100%, but preferably the surface coverage of the channels is less than about 40%, preferably less than about 30%, or less than about 20% or less than about 10%. The lower percentages are more preferable in cases where the channels are combined with other types of surface textures such as the projecting members described above. These projecting members, as shown in FIGS. 4 to 15, may be arranged in any suitable geometric pattern on the surface of the core, and they may be combined with the channels and/or raised beads. For example, these extending members may be combined with the channels and/or raised beads and arranged in a grid or lattice; or a series of rows and raised columns.

The core assembly also may have various "guide patterns" which may comprise geometric patterns, fractal patterns, lines, and various irregular patterns. Alternatively, the guide pattern may be randomly defined. The guide pattern may comprise at least one of irregular shapes and regular shapes. In other embodiments, the guide pattern may comprise a smooth and continuous curve. Methods for forming these textured surfaces on the core involve generating a guide pattern, mapping the guide pattern to the surface of the core, generating a shaped profile, and generating a textured surface for the surface of the core based on sweeping the shaped profile along the guide pattern.

In the present invention, these bands, channels, raised beads are positioned on the surface of the core structure or ball subassembly (the core structure and any casing layers disposed about the core). Such surface patterns are described in Sullivan et al., U.S. Pat. Nos. 8,460,126; 8,033,933; 8,137,216; and 7,588,505 (the '126, '933, '216, and '505 patents), the disclosures including all Figures, of which are hereby incorporated by reference. It is recognized that the '126, '933, '216, and '505 patents describe these surface patterns as being used on the outer cover (surface) of the golf ball and as aerodynamic improvements over conventional dimples on a golf ball cover; however, in the present invention, they are patterns molded (or machined) into the surface of a core or surface of a ball subassembly.

Core Structure—Hardness

As discussed above, the core preferably has a dual-layered structure comprising an inner core and surrounding outer core layer. The hardness of the core subassembly is an important property. In general, cores with relatively high hardness values have higher compression and tend to have good durability and resiliency. However, some high compression balls are stiff and this may have a detrimental effect on shot control. For example, some of these harder balls tend to have a low spin rate and this makes the ball more difficult to control. This can be particularly troubling when making approach shots near the green. Thus, the optimum balance of hardness in the core subassembly needs to be attained.

In one preferred golf ball, the inner core (center) has a "positive" hardness gradient (that is, the outer surface of the inner core is harder than its geometric center); and the outer core layer has a "positive" hardness gradient (that is, the outer surface of the outer core layer is harder than the inner surface of the outer core layer.) In such cases where both the inner core and outer core layer each has a "positive" hardness gradient, the outer surface hardness of the outer core layer is preferably greater than the hardness of the geometric center of the inner core. In one preferred version, the positive hardness gradient of the inner core is in the range of about 2 to about 40 Shore C units and even more preferably about 10 to about 25 Shore C units; while the positive hardness gradient of the outer core is in the range of about 2 to about 20 Shore C and even more preferably about 3 to about 10 Shore C.

In an alternative version, the inner core may have a positive hardness gradient; and the outer core layer may have a "zero" hardness gradient (that is, the hardness values of the outer surface of the outer core layer and the inner surface of the outer core layer are substantially the same) or a "negative" hardness gradient (that is, the outer surface of the outer core layer is softer than the inner surface of the outer core layer.) For example, in one version, the inner core has a positive hardness gradient; and the outer core layer has a negative hardness gradient in the range of about 2 to about 25 Shore C. In a second alternative version, the inner core may have a zero or negative hardness gradient; and the outer core layer may have a positive hardness gradient. Still yet, in another embodiment, both the inner core and outer core layers have zero or negative hardness gradients.

In general, hardness gradients are further described in Bulpett et al., U.S. Pat. Nos. 7,537,529 and 7,410,429, the disclosures of which are hereby incorporated by reference. Methods for measuring the hardness of the inner core and outer core layers along with other layers in the golf ball and determining the hardness gradients of the various layers are described in further detail below. The core layers have positive, negative, or zero hardness gradients defined by hardness measurements made at the outer surface of the inner core (or outer surface of the outer core layer) and radially inward towards the center of the inner core (or inner surface of the outer core layer). These measurements are made typically at 2-mm increments as described in the test methods below. In general, the hardness gradient is determined by subtracting the hardness value at the innermost portion of the component being measured (for example, the center of the inner core or inner surface of the outer core layer) from the hardness value at the outer surface of the component being measured (for example, the outer surface of the inner core or outer surface of the outer core layer).

Positive Hardness Gradient. For example, if the hardness value of the outer surface of the inner core is greater than the hardness value of the inner core's geometric center (that is, the inner core has a surface harder than its geometric center), the hardness gradient will be deemed "positive" (a larger number minus a smaller number equals a positive number.) For example, if the outer surface of the inner core has a hardness of 67 Shore C and the geometric center of the inner core has a hardness of 60 Shore C, then the inner core has a positive hardness gradient of 7. Likewise, if the outer surface of the outer core layer has a greater hardness value than the inner surface of the outer core layer, the given outer core layer will be considered to have a positive hardness gradient.

Negative Hardness Gradient. On the other hand, if the hardness value of the outer surface of the inner core is less than the hardness value of the inner core's geometric center (that is, the inner core has a surface softer than its geometric center), the hardness gradient will be deemed "negative." For example, if the outer surface of the inner core has a hardness of 68 Shore C and the geometric center of the inner core has a hardness of 70 Shore C, then the inner core has a negative hardness gradient of 2. Likewise, if the outer surface of the outer core layer has a lesser hardness value than the inner surface of the outer core layer, the given outer core layer will be considered to have a negative hardness gradient.

Zero Hardness Gradient. In another example, if the hardness value of the outer surface of the inner core is substantially the same as the hardness value of the inner core's geometric center (that is, the surface of the inner core has about the same hardness as the geometric center), the hardness gradient will be deemed "zero." For example, if the outer surface of the inner core and the geometric center of the inner core each has a hardness of 65 Shore C, then the inner core has a zero hardness gradient. Likewise, if the outer surface of the outer core layer has a hardness value approximately the same as the inner surface of the outer core layer, the outer core layer will be considered to have a zero hardness gradient.

More particularly, the term, "positive hardness gradient" as used herein means a hardness gradient of positive 3 Shore C or greater, preferably 7 Shore C or greater, more preferably 10 Shore C, and even more preferably 20 Shore C or greater. The term, "zero hardness gradient" as used herein means a hardness gradient of less than 3 Shore C, preferably less than 1 Shore C and may have a value of zero or negative 1 to negative 10 Shore C. The term, "negative hardness gradient" as used herein means a hardness value of less than zero, for example, negative 3, negative 5, negative 7, negative 10, negative 15, or negative 20 or negative 25. The terms, "zero hardness gradient" and "negative hardness gradient" may be used herein interchangeably to refer to hardness gradients of negative 1 to negative 10.

The center hardness of the inner core ($H_{inner\ core\ center}$), as measured in Shore C units, is preferably about 10 Shore C or greater; for example, the $H_{inner\ core\ center}$ may have a lower limit of about 10 or 14 or 16 or 20 or 23 or 24 or 28 or 31 or 34 or 37 or 40 or 44 Shore C and an upper limit of about 46 or 48 or 50 or 51 or 53 or 55 or 58 or 61 or 62 or 65 or 68 or 71 or 74 or 76 or 78 or 79 or 80 or 84 or 90 Shore C. Concerning the outer surface hardness of the inner core ($H_{inner\ core\ surface}$), this hardness preferably has a lower limit of about 13 or 15 or 18 or 20 or 22 or 24 or 27 or 28 or 30 or 32 or 34 or 38 or 44 or 47 or 48 Shore C and an upper limit of about 50 or 54 or 56 or 61 or 65 or 66 or 68 or 70 or 73 or 76 or 78 or 80 or 84 or 86 or 88 or 90 or 92 Shore C. In another version, the geometric center hardness ($H_{inner\ core\ center}$) is in the range of about 10 Shore C to about 78 Shore C; and the outer surface hardness of the inner core ($H_{inner\ core\ surface}$) is in the range of about 24 Shore C to about 81 Shore C.

On the other hand, the outer core layer preferably has an outer surface hardness ($H_{outer\ surface\ of\ OC}$) of about with a lower limit of about 40 or 42 or 45 or 48 or 50 or 54 or 58 or 60 or 63 or 65 or 67 or 70 or 72 or 73 or 76 Shore C, and an upper limit of about 78 or 80 or 84 or 87 or 88 or 89 or 90 or 92 or 95 or 96 Shore C. And, the inner surface of the outer core layer ($H_{inner\ surface\ of\ OC}$) [or midpoint hardness of the outer core layer ($H_{midpoint\ of\ OC}$)], preferably has a hardness within a range having a lower limit of about 40 or 42 or 44 or 45 or 47 or 50 or 52 or 54 or 55 or 58 or 60 or 63 or 65 or 67 or 70 or 73 or 75 Shore C, and an upper limit of about 78 or 80 or 85 or 87 or 89 or 90 or 92 or 95 Shore C.

In one embodiment, the outer surface hardness of the inner core ($H_{inner\ core\ surface}$) is greater than the center hardness of the inner core ($H_{inner\ core\ center}$) by at least 3 Shore C units and more preferably by at least 5 Shore C; and the outer surface hardness of the outer core layer ($H_{outer\ surface\ of\ OC}$), is greater than the midpoint hardness ($H_{midpoint\ of\ OC}$), of the inner core by at least 3 Shore C units and more preferably by at least 5 Shore C.

In a second embodiment, the outer surface hardness of the inner core ($H_{inner\ core\ surface}$) is less than the center hardness of the inner core ($H_{inner\ core\ center}$) by at least 3 Shore C units; and the outer surface hardness of the outer core layer ($H_{outer\ surface\ of\ OC}$), is greater than the midpoint hardness ($H_{midpoint\ of\ OC}$), of the inner core by at least 3 Shore C units.

As discussed further below, the inner core is preferably formed from a thermoplastic or thermoset polymeric composition containing a metal material dispersed within the polymer matrix. The outer core layer also may be formed from a thermoplastic or thermoset polymeric composition. Preferably, the outer core layer composition does not contain metal.

The core structure also has a hardness gradient across the entire core assembly. In one embodiment, the ($H_{inner\ core\ center}$) is in the range of about 10 to about 80 Shore C, preferably about 20 to about 75 Shore C and more preferably about 25 to about 65 Shore C; and the ($H_{outer\ surface\ of\ OC}$) is in the range of about 65 to about 96 Shore C, preferably about 68 to about 94 Shore C and more preferably about 75 to about 92 Shore C, to provide a positive hardness gradient across the core assembly.

The inner core preferably has a diameter in the range of about 0.100 to about 1.100 inches. For example, the inner core may have a diameter within a range of about 0.300 to about 0.800 inches. More particularly, the inner core may have a diameter size with a lower limit of about 0.10 or 0.12 or 0.15 or 0.25 or 0.30 or 0.35 or 0.45 or 0.55 inches and an upper limit of about 0.60 or 0.65 or 0.70 or 0.80 or 0.90 or 1.00 or 1.10 inches. As far as the outer core layer is concerned, it preferably has a thickness in the range of about 0.200 to about 0.800 inches. For example, the lower limit of thickness may be about 0.200 or 0.210 or 0.250 or 0.300 or 0.340 or 0.400 and the upper limit may be about 0.500 or 0.550 or 0.600 or 0.650 or 0.700 or 0.750 or 0.800 inches.

Inner Core Composition

Preferably, the inner core composition comprises a metal material such as, for example, copper, steel, brass, tungsten, titanium, aluminum, magnesium, molybdenum, cobalt, nickel, iron, lead, tin, bronze, silver, gold, and platinum, and oxides and alloys and combinations thereof. In one embodiment, the metal is a stainless steel material (for example, austenitic, duplex and special, ferritic, martensitic, and precipitation hardening stainless steels.) Such stainless steels are available from Sandvik Materials Technology (Sandvik Osprey, Ltd, Clarks Summit, Pa. USA). In another embodiment, the metal is an alloy selected from the group consisting of binary, cobalt, copper, diamond catalyst, master, MCrAlY, nickel, and super alloys; and mixtures thereof. In yet another embodiment, the metal material is selected from the group consisting of high-speed steels, low-alloy steels, and tool steels; and mixtures thereof.

A gas atomization process can be used to produce these metal powders. In a gas atomization process, a molten metal stream is forced through an orifice at moderate pressures. High velocity air, steam, or inert gas is introduced into the molten metal stream just before it leaves the nozzle, serving to create turbulence as the entrained gas expands (due to heating) and exits the orifice and into the atomizing chamber which is filled with gas to promote further turbulence. The molten metal is changed into small droplets by rapidly freezing them during their fall into the chamber and before they come into contact with each other or a solid surface. This rapid cooling and disintegration produces very fine powder particles. The air and powder streams can be segregated using gravity or cyclonic separation.

In a particularly preferred embodiment, the metal powder is elemental iron powder. Preferably, the elemental iron is in the form of particles, the majority of which having a small particle size, such as a powder. In general, the elemental iron has a weight average particle size of at most 450 µm, preferably at most 200 µm. It is further preferred that the elemental iron having a small particle size has a weight average particle size of at most 200 µm, more preferably at most 100 µm, and still more preferably at most 50 µm. On the other side, the elemental iron has a weight average particle size of at least 10 µm, preferably at least 13 µm. It is further preferred that the elemental iron having a small particle size has a weight average particle size of at least 15 µm, more preferably at least 18 µm, and still more preferably at least 20 µm.

The elemental iron of the present invention has preferably a weight average particle size of 10 to 50 µm, more preferably 15 to 45 µm, still more preferably 20 to 40 µm and most preferably 25 to 35 µm. The weight average particle size is determined as $D_m$ according to ASTM standard D1921-89, Method A. Preferably the size, to be understood as the largest dimension, of at least 99 wt. % of the elemental iron particles is at most 450 µm and preferably at most 200 µm, more preferably at most 100 µm, even more preferably at most 90 µm, still more preferably at most 80 µm and most preferably at most 70 µm. Preferably the size, to be understood as the smallest dimension, of at least 99 wt. % of the elemental iron particles is at least 10 µm and preferably at least 15 µm, more preferably at least 20 µm and most preferably at least 25 µm. The elemental iron in the polymer composition according to the present invention may be used in any amount, which can be varied over a wide range. The elemental iron has shown to be a very effective stabilizer, showing an effect already at very low amounts.

The concentration of the fine metal powder in the composition is generally in the range of about 70 to about 2000 parts-per-hundred (phr). Preferably, the concentration of fine metal powder is in the range of about 80 to about 1500 phr and more preferably in the amount of about 100 to 1125. As used herein, the term, "parts-per-hundred," also known as "phr" or "pph" is defined as the number of parts by weight of a particular component present in a mixture, relative to 100 parts by weight of the polymer component. Mathematically, this can be expressed as the weight of an ingredient divided by the total weight of the polymer, multiplied by a factor of 100.

The metal powder may be dispersed in a polymeric matrix, preferably a thermoset rubber material. The metal material is dispersed uniformly in the polymeric matrix to provide a substantially homogenous composition. The metal material is blended fully into the polymeric matrix to prevent agglomerates and aggregates from being formed. The resulting metal-containing composition is used to form an inner core structure having a relatively high specific gravity, thereby providing a ball having a lower moment of inertia as discussed further below.

Suitable thermoset rubber materials that may be used as the polymeric binder material are natural and synthetic rubbers including, but not limited to, polybutadiene, polyisoprene, ethylene propylene rubber ("EPR"), ethylene-propylene-diene ("EPDM") rubber, styrene-butadiene rubber, styrenic block copolymer rubbers (such as "SI", "SIS", "SB", "SBS", "SIBS", and the like, where "S" is styrene, "I" is isobutylene, and "B" is butadiene), polyalkenamers such as, for example, polyoctenamer, butyl rubber, halobutyl rubber, polystyrene elastomers, polyethylene elastomers, polyurethane elastomers, polyurea elastomers, metallocene-catalyzed elastomers and plastomers, copolymers of isobutylene and p-alkylstyrene, halogenated copolymers of isobutylene and p-alkylstyrene, copolymers of butadiene with acrylonitrile, polychloroprene, alkyl acrylate rubber, chlorinated isoprene rubber, acrylonitrile chlorinated isoprene rubber, and blends of two or more thereof.

Preferably, the rubber composition comprises polybutadiene. In general, polybutadiene is a homopolymer of 1, 3-butadiene. The double bonds in the 1, 3-butadiene monomer are attacked by catalysts to grow the polymer chain and form a polybutadiene polymer having a desired molecular weight. Any suitable catalyst may be used to synthesize the polybutadiene rubber depending upon the desired properties. Normally, a transition metal complex (for example, neodymium, nickel, or cobalt) or an alkyl metal such as alkyllithium is used as a catalyst. Other catalysts include, but are not limited to, aluminum, boron, lithium, titanium, and combinations thereof. The catalysts produce polybutadiene rubbers having different chemical structures. In a cis-bond configuration, the main internal polymer chain of the polybutadiene appears on the same side of the carbon-carbon double bond contained in the polybutadiene. In a trans-bond configuration, the main internal polymer chain is on opposite sides of the internal carbon-carbon double bond in the polybutadiene. The polybutadiene rubber can have various combinations of cis- and trans-bond structures. A preferred polybutadiene rubber has a 1, 4 cis-bond content of at least 40%, preferably greater than 80%, and more preferably greater than 90%. In general, polybutadiene rubbers having a high 1, 4 cis-bond content have high tensile strength. The polybutadiene rubber may have a relatively high or low Mooney viscosity.

Examples of commercially available polybutadiene rubbers that can be used in accordance with this invention, include, but are not limited to, BR 01 and BR 1220, available from BST Elastomers of Bangkok, Thailand; SE BR 1220LA and SE BR1203, available from DOW Chemical Co of Midland, Mich.; BUDENE 1207, 1207s, 1208, and 1280 available from Goodyear, Inc of Akron, Ohio; BR 01, 51 and 730, available from Japan Synthetic Rubber (JSR) of Tokyo, Japan; BUNA CB 21, CB 22, CB 23, CB 24, CB 25, CB 29 MES, CB 60, CB Nd 60, CB 55 NF, CB 70 B, CB KA 8967, and CB 1221, available from Lanxess Corp. of Pittsburgh. Pa.; BR1208, available from LG Chemical of Seoul, South Korea; UBEPOL BR130B, BR150, BR150B, BR150L, BR230, BR360L, BR710, and VCR617, available from UBE Industries, Ltd. of Tokyo, Japan; EUROPRENE NEO-CIS BR 60, INTENE 60 AF and P30AF, and EUROPRENE BR HV80, available from Polimeri Europa of Rome, Italy; AFDENE 50 and NEODENE BR40, BR45, BR50 and BR60, available from Karbochem (PTY) Ltd. of Bruma, South Africa; KBR 01, NdBr 40, NdBR-45, NdBr 60, KBR 710S, KBR 710H, and KBR 750, available from Kumho Petrochemical Co., Ltd. Of Seoul, South Korea; DIENE 55NF, 70AC, and 320 AC, available from Firestone Polymers of Akron, Ohio.

The polybutadiene rubber is used in an amount of at least about 5% by weight based on total weight of composition and is generally present in an amount of about 5% to about 100%, or an amount within a range having a lower limit of 5% or 10% or 20% or 30% or 40% or 50% and an upper limit of 55% or 60% or 70% or 80% or 90% or 95% or 100%. Preferably, the concentration of polybutadiene rubber is about 40 to about 95 weight percent. If desirable, lesser amounts of other thermoset materials may be incorporated into the base rubber. Such materials include the rubbers discussed above, for example, cis-polyisoprene, trans-polyisoprene, balata, polychloroprene, polynorbornene, polyoctenamer, polypentenamer, butyl rubber, EPR, EPDM, styrene-butadiene, and the like.

In another version, a thermoplastic material, for example, an ionomer resin, may be used to form the inner core composition. The ionomer resin is used as the polymeric matrix in the composition used to make the inner core. Suitable ionomer compositions include partially-neutralized ionomers and highly-neutralized ionomers (HNPs), including ionomers formed from blends of two or more partially-neutralized ionomers, blends of two or more highly-neutralized ionomers, and blends of one or more partially-neutralized ionomers with one or more highly-neutralized ionomers. For purposes of the present disclosure, "HNP" refers to an acid copolymer after at least 70% of all acid groups present in the composition are neutralized.

Preferred ionomers are salts of O/X- and O/X/Y-type acid copolymers, wherein O is an α-olefin, X is a $C_3$-$C_8$ α,β-ethylenically unsaturated carboxylic acid, and Y is a softening monomer. O is preferably selected from ethylene and propylene. X is preferably selected from methacrylic acid, acrylic acid, ethacrylic acid, crotonic acid, and itaconic acid. Methacrylic acid and acrylic acid are particularly preferred. Y is preferably selected from (meth) acrylate and alkyl (meth) acrylates wherein the alkyl groups have from 1 to 8 carbon atoms, including, but not limited to, n-butyl (meth) acrylate, isobutyl (meth) acrylate, methyl (meth) acrylate, and ethyl (meth) acrylate.

Preferred O/X and O/X/Y-type copolymers include, without limitation, ethylene acid copolymers, such as ethylene/(meth)acrylic acid, ethylene/(meth)acrylic acid/maleic anhydride, ethylene/(meth)acrylic acid/maleic acid monoester, ethylene/maleic acid, ethylene/maleic acid mono-ester, ethylene/(meth)acrylic acid/n-butyl (meth) acrylate, ethylene/(meth)acrylic acid/iso-butyl (meth) acrylate, ethylene/(meth)acrylic acid/methyl (meth) acrylate, ethylene/(meth) acrylic acid/ethyl (meth)acrylate terpolymers, and the like. The term, "copolymer," as used herein, includes polymers having two types of monomers, those having three types of monomers, and those having more than three types of monomers. Preferred α, β-ethylenically unsaturated mono- or dicarboxylic acids are (meth) acrylic acid, ethacrylic acid, maleic acid, crotonic acid, fumaric acid, itaconic acid. (Meth) acrylic acid is most preferred. As used herein, "(meth) acrylic acid" means methacrylic acid and/or acrylic acid. Likewise, "(meth) acrylate" means methacrylate and/or acrylate.

In a particularly preferred version, highly neutralized E/X- and E/X/Y-type acid copolymers, wherein E is ethylene, X is a $C_3$-$C_8$ α,β-ethylenically unsaturated carboxylic acid, and Y is a softening monomer are used. X is preferably selected from methacrylic acid, acrylic acid, ethacrylic acid, crotonic acid, and itaconic acid. Methacrylic acid and acrylic acid are particularly preferred. Y is preferably an acrylate selected from alkyl acrylates and aryl acrylates and preferably selected from (meth) acrylate and alkyl (meth) acrylates wherein the alkyl groups have from 1 to 8 carbon atoms, including, but not limited to, n-butyl (meth) acrylate, isobutyl (meth) acrylate, methyl (meth) acrylate, and ethyl (meth) acrylate. Preferred E/X/Y-type copolymers are those wherein X is (meth) acrylic acid and/or Y is selected from (meth) acrylate, n-butyl (meth) acrylate, isobutyl (meth) acrylate, methyl (meth) acrylate, and ethyl (meth) acrylate. More preferred E/X/Y-type copolymers are ethylene/(meth) acrylic acid/n-butyl acrylate, ethylene/(meth) acrylic acid/methyl acrylate, and ethylene/(meth) acrylic acid/ethyl acrylate.

The amount of ethylene in the acid copolymer is typically at least 15 wt. %, preferably at least 25 wt. %, more preferably least 40 wt. %, and even more preferably at least 60 wt. %, based on total weight of the copolymer. The amount of $C_3$ to $C_8$ α, β-ethylenically unsaturated mono- or dicarboxylic acid in the acid copolymer is typically from 1 wt. % to 35 wt. %, preferably from 5 wt. % to 30 wt. %, more preferably from 5 wt. % to 25 wt. %, and even more preferably from 10 wt. % to 20 wt. %, based on total weight of the copolymer. The amount of optional softening comonomer in the acid copolymer is typically from 0 wt. % to 50 wt. %, preferably from 5 wt. % to 40 wt. %, more preferably from 10 wt. % to 35 wt. %, and even more preferably from 20 wt. % to 30 wt. %, based on total weight of the copolymer. "Low acid" and "high acid" ionomeric polymers, as well as blends of such ionomers, may be used. In general, low acid ionomers are considered to be those containing 16 wt. % or less of acid moieties, whereas high acid ionomers are considered to be those containing greater than 16 wt. % of acid moieties.

The various O/X, E/X, O/X/Y, and E/X/Y-type copolymers are at least partially neutralized with a cation source, optionally in the presence of a high molecular weight organic acid, such as those disclosed in Rajagopalan et al., U.S. Pat. No. 6,756,436, the entire disclosure of which is hereby incorporated herein by reference. The acid copolymer can be reacted with the optional high molecular weight organic acid and the cation source simultaneously, or prior to the addition of the cation source. Suitable cation sources include, but are not limited to, metal ion sources, such as compounds of alkali metals, alkaline earth metals, transition metals, and rare earth elements; ammonium salts and monoamine salts; and combinations thereof. Preferred cation sources are compounds of magnesium, sodium, potassium, cesium, calcium, barium, manganese, copper, zinc, lead, tin, aluminum, nickel, chromium, lithium, and rare earth metals. The amount of cation used in the composition is readily determined based on desired level of neutralization. As discussed above, for HNP compositions, the acid groups are neutralized to 70% or greater, preferably 70 to 100%, more preferably 90 to 100%. In one embodiment, an excess amount of neutralizing agent, that is, an amount greater than the stoichiometric amount needed to neutralize the acid groups, may be used. That is, the acid groups may be neutralized to 100% or greater, for example 110% or 120% or greater. In other embodiments, partially-neutralized compositions are prepared, wherein 10% or greater, normally 30% or greater of the acid groups are neutralized. When aluminum is used as the cation source, it is preferably used at low levels with another cation such as zinc, sodium, or lithium, since aluminum has a dramatic effect on melt flow reduction and cannot be used alone at high levels. For example, aluminum is used to neutralize about 10% of the acid groups and sodium is added to neutralize an additional 90% of the acid groups.

"Ionic plasticizers" such as organic acids or salts of organic acids, particularly fatty acids, may be added to the ionomer resin. Such ionic plasticizers are used to make conventional ionomer composition more processable as described in the above-mentioned U.S. Pat. No. 6,756,436. In the present invention such ionic plasticizers are optional. In one preferred embodiment, a thermoplastic ionomer composition is made by neutralizing about 70 wt % or more of the acid groups without the use of any ionic plasticizer. On the other hand, in some instances, it may be desirable to add a small amount of ionic plasticizer, provided that it does not adversely affect the heat-resistance properties of the composition. For example, the ionic plasticizer may be added in an amount of about 10 to about 60 weight percent (wt. %) of the composition, more preferably 30 to 55 wt. %.

The organic acids may be aliphatic, mono- or multifunctional (saturated, unsaturated, or multi-unsaturated) organic acids. Salts of these organic acids may also be employed. Suitable fatty acid salts include, for example, metal stearates, laureates, oleates, palmitates, pelargonates, and the like. For example, fatty acid salts such as zinc stearate, calcium stearate, magnesium stearate, barium stearate, and the like can be used. The salts of fatty acids are generally fatty acids neutralized with metal ions. The metal cation salts provide the cations capable of neutralizing (at varying levels) the carboxylic acid groups of the fatty acids. Examples include the sulfate, carbonate, acetate and hydroxide salts of metals such as barium, lithium, sodium, zinc, bismuth, chromium, cobalt, copper, potassium, strontium, titanium, tungsten, magnesium, cesium, iron, nickel, silver, aluminum, tin, or calcium, and blends thereof. It is preferred the organic acids and salts be relatively non-migratory (they do not bloom to the surface of the polymer under ambient temperatures) and non-volatile (they do not volatilize at temperatures required for melt-blending).

Other suitable thermoplastic polymers that may be used to form the inner cover layer include, but are not limited to, the following polymers (including homopolymers, copolymers, and derivatives thereof.) (a) polyesters, particularly those modified with a compatibilizing group such as sulfonate or phosphonate, including modified poly(ethylene terephthalate), modified poly(butylene terephthalate), modified poly(propylene terephthalate), modified poly(trimethylene terephthalate), modified poly(ethylene naphthenate), and those disclosed in U.S. Pat. Nos. 6,353,050, 6,274,298, and 6,001,930, the entire disclosures of which are hereby incorporated herein by reference, and blends of two or more thereof; (b) polyamides, polyamide-ethers, and polyamide-esters, and those disclosed in U.S. Pat. Nos. 6,187,864, 6,001,930, and 5,981,654, the entire disclosures of which are hereby incorporated herein by reference, and blends of two or more thereof; (c) polyurethanes, polyureas, polyurethane-polyurea hybrids, and blends of two or more thereof; (d) fluoropolymers, such as those disclosed in U.S. Pat. Nos. 5,691,066, 6,747,110 and 7,009,002, the entire disclosures of which are hereby incorporated herein by reference, and blends of two or more thereof; (e) polystyrenes, such as poly(styrene-co-maleic anhydride), acrylonitrile-butadiene-styrene, poly(styrene sulfonate), polyethylene styrene, and blends of two or more thereof; (f) polyvinyl chlorides and grafted polyvinyl chlorides, and blends of two or more thereof; (g) polycarbonates, blends of polycarbonate/acrylonitrile-butadiene-styrene, blends of polycarbonate/polyurethane, blends of polycarbonate/polyester, and blends of two or more thereof; (h) polyethers, such as polyarylene ethers, polyphenylene oxides, block copolymers of alkenyl aromatics with vinyl aromatics and polyamicesters, and blends of two or more thereof; (i) polyimides, polyetherketones, polyamideimides, and blends of two or more thereof; and (j) polycarbonate/polyester copolymers and blends.

It also is recognized that thermoplastic materials can be "converted" into thermoset materials by cross-linking the polymer chains so they form a network structure, and such cross-linked thermoplastic materials may be used to form the inner cover layers in accordance with this invention. For example, thermoplastic polyolefins such as linear low density polyethylene (LLDPE), low density polyethylene (LDPE), and high density polyethylene (HDPE) may be cross-linked to form bonds between the polymer chains. The cross-linked thermoplastic material typically has improved physical properties and strength over non-cross-linked thermoplastics, particularly at temperatures above the crystalline melting point. Preferably a partially or fully-neutralized ionomer, as described above, is covalently cross-linked to render it into a thermoset composition (that is, it contains at least some level of covalent, irreversable cross-links). Thermoplastic polyurethanes and polyureas also may be converted into thermoset materials in accordance with the present invention.

Modifications in the thermoplastic polymeric structure of thermoplastics can be induced by a number of methods, including exposing the thermoplastic material to high-energy radiation or through a chemical process using peroxide. Radiation sources include, but are not limited to, gamma-rays, electrons, neutrons, protons, x-rays, helium nuclei, or the like. Gamma radiation, typically using radioactive cobalt atoms and allows for considerable depth of treatment, if necessary. For core layers requiring lower depth of penetration, electron-beam accelerators or UV and IR light sources can be used. Useful UV and IR irradiation methods are disclosed in U.S. Pat. Nos. 6,855,070 and 7,198,576, which are incorporated herein by reference. The thermoplastic core layers may be irradiated at dosages greater than 0.05 Mrd, preferably ranging from 1 Mrd to 20 Mrd, more preferably from 2 Mrd to 15 Mrd, and most preferably from 4 Mrd to 10 Mrd. In one preferred embodiment, the cores are irradiated at a dosage from 5 Mrd to 8 Mrd and in another preferred embodiment, the cores are irradiated with a dosage from 0.05 Mrd to 3 Mrd, more preferably 0.05 Mrd to 1.5 Mrd.

The cross-linked thermoplastic material may be created by exposing the thermoplastic to: 1) a high-energy radiation treatment, such as electron beam or gamma radiation, such as disclosed in U.S. Pat. No. 5,891,973, which is incorporated by reference herein, 2) lower energy radiation, such as ultra-violet (UV) or infra-red (IR) radiation; 3) a solution treatment, such as an isocyanate or a silane; 4) incorporation of additional free radical initiator groups in the thermoplastic prior to molding; and/or 5) chemical modification, such as esterification or saponification, to name a few.

As discussed above, the composition used to form the inner core contains a metal material. In one version, the metal material can constitute the entire inner core. That is, the metal material comprises 100% of the composition used to make the inner core. The metal material is preferably in the shape of a solid sphere, for example, a ball bearing. The metal sphere can be used as the inner core (center) and a polymeric outer core layer can be disposed about the metal center. Alternatively, metal fillers, as described further below, can be dispersed in a polymeric matrix to form a metal-containing composition that can be used to make the inner core. Relatively heavy-weight metal materials such as, for example, a metal selected from the group consisting of copper, nickel, tungsten, brass, steel, magnesium, molybdenum, cobalt, lead, tin, silver, gold and platinum alloys can be used. Various combinations of such metals and metal oxides also can be used. Suitable steel materials include, for example, chrome steel, stainless steel, carbon steel, and alloys thereof. Alternatively, or in addition to the heavy metals, relatively light-weight metal materials such as titanium and aluminum alloys can be used, provided the inner core layer has the required specific gravity. The metal filler is added to the composition in a sufficient amount to obtain the desired specific gravity as discussed further below.

If the size of the inner core (center) is small and a dense metal material such as tungsten is being used, then the amount of tungsten needed to obtain the desired specific gravity will be relatively low. The weight of such a dense metal material is more concentrated so a smaller amount of material is needed. On the other hand, if a low density metal material such as aluminum is being used, then the amount of aluminum needed to reach the needed specific gravity will be relatively high. Normally, the metal filler is present in the composition in an amount with the range of about 1% to about 60%. Preferably, the metal filler is present in the composition in an amount of 20 wt. % or less, 15 wt % or less, or 12 wt % or less, or 10 wt % or less, or 6 wt % or less, or 4 wt % or less based on weight of polymer in the composition.

The overall specific gravity of the core structure (inner core and outer core layers) is preferably at least 1.8 g/cc, more preferably at least 2.00 g/cc, and most preferably at least 2.50 g/cc. In general, the inner core has a specific gravity of at least about 1.00 g/cc and is generally within the range of about 1.00 to about 20.00. Preferably, the inner core has a lower limit of specific gravity of about 1.10 or 1.20 or 1.50 or 2.00 or 2.50 or 3.50 or 4.00 or 5.00 or 6.00 or 7.00 or 8.00 g/cc and an upper limit of about 9.00 or 9.50 or 10.00 or 10.50 or 11.00 or 12.00 or 13.00 or 14.00 or 15.00 or 16.00 or 17.00 or 18.00 or 19.00 or 19.50 g/cc. In a preferred embodiment, the inner core has a specific gravity of about 1.20 to about 5.50 g/cc, more preferably about 1.25 to about 3.25 g/cc.

Meanwhile, the outer core layer preferably has a relatively low specific gravity. Thus, the specific gravity of inner core layer ($SG_{inner}$) is preferably greater than the specific gravity of the outer core layer ($SG_{outer}$). For example, the outer core layer may have a specific gravity within a range having a lower limit of about 0.80, 0.90 g/cc, 1.00 or 1.25 or 2.00 or 2.50 or 3.00 or 3.50 or 4.00, 4.25 or 5.00 and an upper limit of about 6.00 or 6.50 or 7.00 or 7.25 or 8.00 or 8.50 or 9.00 or 9.25 or 10.00 g/cc. In one preferred embodiment, the $SG_{inner}$ is preferably greater than the $SG_{outer}$ by at least 0.5 g/cc, more preferably 0.75 g/cc or greater, and even more preferably 1.00 g/cc or greater. In one embodiment, the difference between the $SG_{inner}$ and the $SG_{outer}$ is within the range of about 0.5 g/cc to about 2.0 g/cc.

Suitable metal fillers that can be added to the polymeric matrix used to form the inner core preferably have specific gravity values in the range from about 1.5 to about 19.5, and include, for example, metal (or metal alloy) powder, metal oxide, metal stearates, particulates, flakes, and the like, and blends thereof. Examples of useful metal (or metal alloy) powders include, but are not limited to, bismuth powder, boron powder, brass powder, bronze powder, cobalt powder, copper powder, iron powder, molybdenum powder, nickel powder, stainless steel powder, titanium metal powder, zirconium oxide powder, aluminum flakes, tungsten metal powder, beryllium metal powder, zinc metal powder, or tin metal powder. Examples of metal oxides include, but are not limited to, zinc oxide, iron oxide, aluminum oxide, titanium dioxide, magnesium oxide, zirconium oxide, and tungsten trioxide.

Outer Core Composition

As discussed above, the inner core may be formed from metal-filled thermoset or thermoplastic materials and is preferably formed from a metal-filled thermoset rubber. Likewise, the outer core layer may be formed from thermoset or thermoplastic materials. For example, the outer core layer may be formed of from a rubber or ethylene acid copolymer composition as described above. Preferably, the outer core layer is formed from a thermoset rubber composition. That is, the same rubber composition (except for the metal fillers used to adjust the specific gravity to the desired level) that is used to form the inner core also may be used to form the outer core layer. Thus, each of the inner and outer core layers may be formed from a polybutadiene rubber composition. The rubber compositions may contain conventional additives such as free-radical initiators, cross-linking agents, soft and fast agents, and antioxidants, and the composition may be cured using conventional systems as described further below. However, the specific gravity of the inner core and outer core layers will be different; thus, the concentration and/or type of metal fillers used in the respective compositions to adjust the specific gravity will be different. In one embodiment, the outer core layer may not even contain any metal materials. In another embodiment, the outer core layer may contain a relatively small concentration of metal fillers, while the inner core contains a large concentration of metal fillers.

As discussed above, the specific gravity of inner core layer ($SG_{inner}$) is preferably greater than the specific gravity of the outer core layer ($SG_{outer}$). In general, the specific gravities of the respective pieces of an object affect the Moment of Inertia (MOI) of the object. The Moment of Inertia of a ball (or other object) about a given axis generally refers to how difficult it is to change the ball's angular motion about that axis. If the ball's mass is concentrated towards the center, less force is required to change its rotational rate, and the ball has a relatively low Moment of Inertia. In such balls, the center piece (that is, the inner core) has a higher specific gravity than the outer piece (that is, the outer core layer). In such balls, most of the mass is located close to the ball's axis of rotation and less force is needed to generate spin. Thus, the ball has a generally high spin rate as the ball leaves the club's face after making impact. Because of the high spin rate, amateur golfers may have a difficult time controlling the ball and hitting it in a relatively straight line. Such high-spin balls tend to have a side-spin so that when a golfer hook or slices the ball, it may drift off-course.

Conversely, if the ball's mass is concentrated towards the outer surface, more force is required to change its rotational rate, and the ball has a relatively high Moment of Inertia. In such balls, the center piece (that is, the inner core) has a lower specific gravity than the outer piece (that is, the outer core layer). That is, in such balls, most of the mass is located away from the ball's axis of rotation and more force is needed to generate spin. Thus, the ball has a generally low spin rate as the ball leaves the club's face after making impact. Because of the low spin rate, amateur golfers may have an easier time controlling the ball and hitting it in a relatively straight line. The ball tends to travel a greater distance which is particularly important for driver shots off the tee.

As described in Sullivan, U.S. Pat. No. 6,494,795 and Ladd et al., U.S. Pat. No. 7,651,415, the formula for the Moment of Inertia for a sphere through any diameter is given in the CRC Standard Mathematical Tables, 24th Edition, 1976 at 20 (hereinafter CRC reference). In the present invention, the finished golf balls preferably have a Moment of Inertia in the range of about 55.0 g./cm$^2$ to about 95.0 g./cm$^2$, preferably about 62.0 g./cm$^2$ to about 92.0 g./cm$^2$ Samples of finished golf balls having such Moment of Inertia values are provided in the Examples below.

The term, "specific gravity" as used herein, has its ordinary and customary meaning, that is, the ratio of the density of a substance to the density of water at 4° C., and the density of water at this temperature is 1 g/cm$^3$.

The golf balls of this invention tend to have a low Moment of Inertia and are relatively high spin. The above-described core construction (wherein the inner core is made of a metal-containing composition and contains projecting members on its outer surface) and wherein the specific gravity of the inner core is greater than the specific gravity of the outer core ($SG_{center}$>$SG_{outer\ core}$) contributes to a ball having relatively high spin. Most of the ball's mass is located near the ball's center (axis of rotation) and this helps produce a lower spin rate. The cores and resulting balls also have relatively high resiliency so the ball will reach a relatively high velocity when struck by a golf club and travel a long distance.

The cores of this invention typically have a COR of about 0.75 or greater; and preferably about 0.80 or greater. The compression of the core preferably is about 50 to about 130 and more preferably in the range of about 70 to about 110.

Curing of Rubber Composition

The rubber compositions of this invention may be cured using conventional curing processes. Suitable curing processes include, for example, peroxide-curing, sulfur-curing, high-energy radiation, and combinations thereof. Preferably, the rubber composition contains a free-radical initiator selected from organic peroxides, high energy radiation sources capable of generating free-radicals, and combinations thereof. In one preferred version, the rubber composition is peroxide-cured. Suitable organic peroxides include, but are not limited to, dicumyl peroxide; n-butyl-4,4-di(t-butylperoxy) valerate; 1,1-di(t-butylperoxy)3,3,5-trimethyl-cyclohexane; 2,5-dimethyl-2,5-di(t-butylperoxy) hexane; di-t-butyl peroxide; di-t-amyl peroxide; t-butyl peroxide; t-butyl cumyl peroxide; 2,5-dimethyl-2,5-di(t-butylperoxy) hexyne-3; di(2-t-butyl-peroxyisopropyl)benzene; dilauroyl peroxide; dibenzoyl peroxide; t-butyl hydroperoxide; and combinations thereof. In a particular embodiment, the free radical initiator is dicumyl peroxide, including, but not limited to Perkadox® BC, commercially available from Akzo Nobel. Peroxide free-radical initiators are generally present in the rubber composition in an amount of at least 0.05 parts by weight per 100 parts of the total rubber, or an amount within the range having a lower limit of 0.05 parts or 0.1 parts or 1 part or 1.25 parts or 1.5 parts or 2.5 parts or 5 parts by weight per 100 parts of the total rubbers, and an upper limit of 2.5 parts or 3 parts or 5 parts or 6 parts or 10 parts or 15 parts by weight per 100 parts of the total rubber.

The rubber compositions may further include a reactive cross-linking co-agent. Suitable co-agents include, but are not limited to, metal salts of unsaturated carboxylic acids having from 3 to 8 carbon atoms; unsaturated vinyl compounds and polyfunctional monomers (e.g., trimethylolpropane trimethacrylate); phenylene bismaleimide; and combinations thereof. Particular examples of suitable metal salts include, but are not limited to, one or more metal salts of acrylates, diacrylates, methacrylates, and dimethacrylates, wherein the metal is selected from magnesium, calcium, zinc, aluminum, lithium, and nickel. In a particular embodiment, the co-agent is selected from zinc salts of acrylates, diacrylates, methacrylates, and dimethacrylates. In another particular embodiment, the agent is zinc diacrylate (ZDA). When the co-agent is zinc diacrylate and/or zinc dimethacrylate, the co-agent is typically included in the rubber composition in an amount within the range having a lower limit of 1 or 5 or 10 or 15 or 19 or 20 parts by weight per 100 parts of the total rubber, and an upper limit of 24 or 25 or 30 or 35 or 40 or 45 or 50 or 60 parts by weight per 100 parts of the base rubber.

Radical scavengers such as a halogenated organosulfur, organic disulfide, or inorganic disulfide compounds may be added to the rubber composition. These compounds also may function as "soft and fast agents." As used herein, "soft and fast agent" means any compound or a blend thereof that is capable of making a core: 1) softer (having a lower compression) at a constant "coefficient of restitution" (COR); and/or 2) faster (having a higher COR at equal compression), when compared to a core equivalently prepared without a soft and fast agent. Preferred halogenated organosulfur compounds include, but are not limited to, pentachlorothiophenol (PCTP) and salts of PCTP such as zinc pentachlorothiophenol (ZnPCTP). Using PCTP and ZnPCTP in golf ball inner cores helps produce softer and faster inner cores. The PCTP and ZnPCTP compounds help increase the resiliency and the coefficient of restitution of the core. In a particular embodiment, the soft and fast agent is selected from ZnPCTP, PCTP, ditolyl disulfide, diphenyl disulfide, dixylyl disulfide, 2-nitroresorcinol, and combinations thereof.

As discussed above, the compositions of this invention are formulated to have specific gravity levels so that they can be used to form certain core components of the golf ball. In addition to the metal fillers discussed above, the rubber compositions may contain other additives. Examples of useful fillers include but are not limited to, carbonaceous materials such as graphite and carbon black. graphite fibers, precipitated hydrated silica, clay, talc, glass fibers, aramid fibers, mica, calcium metasilicate, barium sulfate, zinc sulfide, silicates, diatomaceous earth, calcium carbonate, magnesium carbonate, rubber regrind (which is recycled uncured rubber material which is mixed and ground), cotton flock, natural bitumen, cellulose flock, and leather fiber. Micro balloon fillers such as glass and ceramic, and fly ash fillers can also be used.

In a particular aspect of this embodiment, the rubber composition includes filler(s) selected from carbon black, nanoclays (e.g., Cloisite® and Nanofil® nanoclays, commercially available from Southern Clay Products, Inc., and Nanomax® and Nanomer® nanoclays, commercially available from Nanocor, Inc.), talc (e.g., Luzenac HAR® high aspect ratio talcs, commercially available from Luzenac America, Inc.), glass (e.g., glass flake, milled glass, and microglass), mica and mica-based pigments (e.g., Iriodin® pearl luster pigments, commercially available from The Merck Group), and combinations thereof.

In addition, the rubber compositions may include antioxidants. Also, processing aids such as high molecular weight organic acids and salts thereof may be added to the composition. Suitable organic acids are aliphatic organic acids, aromatic organic acids, saturated mono-functional organic acids, unsaturated monofunctional organic acids, multi-unsaturated mono-functional organic acids, and dimerized derivatives thereof. Particular examples of suitable organic acids include, but are not limited to, caproic acid, caprylic acid, capric acid, lauric acid, stearic acid, behenic acid, erucic acid, oleic acid, linoleic acid, myristic acid, benzoic acid, palmitic acid, phenylacetic acid, naphthalenoic acid, and dimerized derivatives thereof. The organic acids are aliphatic, mono-functional (saturated, unsaturated, or multi-unsaturated) organic acids. Salts of these organic acids may also be employed. The salts of organic acids include the salts of barium, lithium, sodium, zinc, bismuth, chromium, cobalt, copper, potassium, strontium, titanium, tungsten, magnesium, cesium, iron, nickel, silver, aluminum, tin, or calcium, salts of fatty acids, particularly stearic, behenic, erucic, oleic, linoelic or dimerized derivatives thereof. It is preferred that the organic acids and salts of the present invention be relatively non-migratory (they do not bloom to the surface of the polymer under ambient temperatures) and non-volatile (they do not volatilize at temperatures required for melt-blending.)

Other ingredients such as processing aids, dyes and pigments, wetting agents, surfactants, plasticizers, coloring agents, fluorescent agents, chemical blowing and foaming agents, defoaming agents, stabilizers, softening agents, impact modifiers, antioxidants, antiozonants, as well as other additives known in the art may be added to the rubber composition.

Cover Structure

The golf ball cores of this invention may be enclosed with one or more cover layers. In one version, the golf ball includes a multi-layered cover comprising inner and outer cover layers. The inner cover layer is preferably formed from a composition comprising an ionomer or a blend of two or more ionomers that helps impart hardness to the ball. In a particular embodiment, the inner cover layer is formed from a composition comprising a high acid ionomer. A particularly suitable high acid ionomer is Surlyn 8150® (DuPont). Surlyn 8150® is a copolymer of ethylene and methacrylic acid, having an acid content of 19 wt %, which is 45% neutralized with sodium. In another particular embodiment, the inner cover layer is formed from a composition comprising a high acid ionomer and a maleic anhydride-grafted non-ionomeric polymer. A particularly suitable maleic anhydride-grafted polymer is Fusabond 525D® (DuPont). Fusabond 525D® is a maleic anhydride-grafted, metallocene-catalyzed ethylene-butene copolymer having about 0.9 wt % maleic anhydride grafted onto the copolymer. A particularly preferred blend of high acid ionomer and maleic anhydride-grafted polymer is an 84 wt %/16 wt % blend of Surlyn 8150® and Fusabond 525D®. Blends of high acid ionomers with maleic anhydride-grafted polymers are further disclosed, for example, in U.S. Pat. Nos. 6,992,135 and 6,677,401, the entire disclosures of which are hereby incorporated herein by reference.

The inner cover layer also may be formed from a composition comprising a 50/45/5 blend of Surlyn® 8940/Surlyn® 9650/Nucrel® 960, and, in a particularly preferred embodiment, the composition has a material hardness of from 80 to 85 Shore C. In yet another version, the inner cover layer is formed from a composition comprising a 50/25/25 blend of Surlyn® 8940/Surlyn® 9650/Surlyn® 9910, preferably having a material hardness of about 90 Shore C. The inner cover layer also may be formed from a composition comprising a 50/50 blend of Surlyn® 8940/Surlyn® 9650, preferably having a material hardness of about 86 Shore C. A composition comprising a 50/50 blend of Surlyn® 8940 and Surlyn® 7940 also may be used. Surlyn® 8940 is an E/MAA copolymer in which the MAA acid groups have been partially neutralized with sodium ions. Surlyn® 9650 and Surlyn® 9910 are two different grades of E/MAA copolymer in which the MAA acid groups have been partially neutralized with zinc ions. Nucrel® 960 is an E/MAA copolymer resin nominally made with 15 wt % methacrylic acid.

A wide variety of materials may be used for forming the outer cover including, for example, polyurethanes; polyureas; copolymers, blends and hybrids of polyurethane and polyurea; olefin-based copolymer ionomer resins (for example, Surlyn® ionomer resins and DuPont HPF® 1000 and HPF® 2000, commercially available from DuPont; Iotek® ionomers, commercially available from ExxonMobil Chemical Company; Amplify® IO ionomers of ethylene acrylic acid copolymers, commercially available from The Dow Chemical Company; and Clarix® ionomer resins, commercially available from A. Schulman Inc.); polyethylene, including, for example, low density polyethylene, linear low density polyethylene, and high density polyethylene; polypropylene; rubber-toughened olefin polymers; acid copolymers, for example, poly(meth)acrylic acid, which do not become part of an ionomeric copolymer; plastomers; flexomers; styrene/butadiene/styrene block copolymers; styrene/ethylene-butylene/styrene block copolymers; dynamically vulcanized elastomers; copolymers of ethylene and vinyl acetates; copolymers of ethylene and methyl acrylates; polyvinyl chloride resins; polyamides, poly(amide-ester) elastomers, and graft copolymers of ionomer and polyamide including, for example, Pebax® thermoplastic polyether block amides, commercially available from Arkema Inc; cross-linked trans-polyisoprene and blends thereof; polyester-based thermoplastic elastomers, such as Hytrel®, commercially available from DuPont or RiteFlex®, commercially available from Ticona Engineering Polymers; polyurethane-based thermoplastic elastomers, such as Elastollan®, commercially available from BASF; synthetic or natural vulcanized rubber; and combinations thereof. Castable polyurethanes, polyureas, and hybrids of polyurethanes-polyureas are particularly desirable because these materials can be used to make a golf ball having high resiliency and a soft feel. By the term, "hybrids of polyurethane and polyurea," it is meant to include copolymers and blends thereof.

Polyurethanes, polyureas, and blends, copolymers, and hybrids of polyurethane/polyurea are also particularly suitable for forming cover layers. When used as cover layer materials, polyurethanes and polyureas can be thermoset or thermoplastic. Thermoset materials can be formed into golf ball layers by conventional casting or reaction injection molding techniques. Thermoplastic materials can be formed into golf ball layers by conventional compression or injection molding techniques.

The inner cover layer preferably has a material hardness within a range having a lower limit of 70 or 75 or 80 or 82 Shore C and an upper limit of 85 or 86 or 90 or 92 Shore C. The thickness of the inner cover layer is preferably within a range having a lower limit of 0.010 or 0.015 or 0.020 or 0.030 inches and an upper limit of 0.035 or 0.045 or 0.080 or 0.120 inches. The outer cover layer preferably has a material hardness of 85 Shore C or less. The thickness of the outer cover layer is preferably within a range having a lower limit of 0.010 or 0.015 or 0.025 inches and an upper limit of 0.035 or 0.040 or 0.055 or 0.080 inches. Methods for measuring hardness of the layers in the golf ball are described in further detail below.

As discussed above, the core structure of this invention may be enclosed with one or more cover layers. In one embodiment, a multi-layered cover comprising inner and outer cover layers is formed, where the inner cover layer has a thickness of about 0.01 inches to about 0.06 inches, more preferably about 0.015 inches to about 0.040 inches, and most preferably about 0.02 inches to about 0.035 inches. In this version, the inner cover layer is formed from a partially- or fully-neutralized ionomer having a Shore D hardness of greater than about 55, more preferably greater than about 60, and most preferably greater than about 65. The outer cover layer, in this embodiment, preferably has a thickness of about 0.015 inches to about 0.055 inches, more preferably about 0.02 inches to about 0.04 inches, and most preferably about 0.025 inches to about 0.035 inches, with a hardness of about Shore D 80 or less, more preferably 70 or less, and most preferably about 60 or less. The inner cover layer is harder than the outer cover layer in this version. A preferred outer cover layer is a castable or reaction injection molded polyurethane, polyurea or copolymer, blend, or hybrid thereof having a Shore D hardness of about 40 to about 50. In another multi-layer cover, dual-core embodiment, the outer cover and inner cover layer materials and thickness are the same but, the hardness range is reversed, that is, the outer cover layer is harder than the inner cover layer. For this harder outer cover/softer inner cover embodiment, the ionomer resins described above would preferably be used as outer cover material.

Golf Ball Construction

The solid cores for the golf balls of this invention may be made using any suitable conventional technique such as, for example, compression or injection molding. Typically, the inner core is formed by compression molding a slug of the uncured or lightly cured polybutadiene rubber material into a spherical structure. Inner cores having non-spherical structures also cane be made. The intermediate and outer core layers, which surround the inner core, are formed by molding compositions over the inner core. Compression or injection molding techniques may be used. Then, the intermediate (casing) and/or cover layers are applied. Prior to this step, the core structure may be surface-treated to increase the adhesion between its outer surface and the next layer that will be applied over the core. Such surface-treatment may include mechanically or chemically-abrading the outer surface of the core. For example, the core may be subjected to corona-discharge, plasma-treatment, silane-dipping, or other treatment methods known to those in the art.

The cover layers are formed over the core or ball subassembly (the core structure and any casing layers disposed about the core) using a suitable technique such as, for example, compression-molding, flip-molding, injection-molding, retractable pin injection-molding, reaction injection-molding (RIM), liquid injection-molding, casting, spraying, powder-coating, vacuum-forming, flow-coating, dipping, spin-coating, and the like. Preferably, each cover layer is separately formed over the ball subassembly. For example, an ethylene acid copolymer ionomer composition may be injection-molded to produce half-shells. Alternatively, the ionomer composition can be placed into a compression mold and molded under sufficient pressure, temperature, and time to produce the hemispherical shells. The smooth-surfaced hemispherical shells are then placed around the ball subassembly in a compression mold. Under sufficient heating and pressure, the shells fuse together to form an inner cover layer that surrounds the subassembly. In another method, the ionomer composition is injection-molded directly onto the core using retractable pin injection molding. An outer cover layer comprising a polyurethane or polyurea composition may be formed by using a casting process.

For example, in one version of the casting process, a liquid mixture of reactive polyurethane prepolymer and chain-extender (curing agent) is poured into lower and upper mold cavities. Then, the golf ball subassembly is lowered at a controlled speed into the reactive mixture. Ball suction cups can hold the ball subassembly in place via reduced pressure or partial vacuum. After sufficient gelling of the reactive mixture (typically about 4 to about 12 seconds), the vacuum is removed and the intermediate ball is released into the mold cavity. Then, the upper mold cavity is mated with the lower mold cavity under sufficient pressure and heat. An exothermic reaction occurs when the polyurethane prepolymer and chain extender are mixed and this continues until the cover material encapsulates and solidifies around the ball subassembly. Finally, the molded balls are cooled in the mold and removed when the molded cover is hard enough so that it can be handled without deformation.

After the golf balls have been removed from the mold, they may be subjected to finishing steps such as flash-trimming, surface-treatment, marking, coating, and the like using techniques known in the art. For example, in traditional white-colored golf balls, the white-pigmented cover may be surface-treated using a suitable method such as, for example, corona, plasma, or ultraviolet (UV) light-treatment. Then, indicia such as trademarks, symbols, logos, letters, and the like may be printed on the ball's cover using pad-printing, ink-jet printing, dye-sublimation, or other suitable printing methods. Clear surface coatings (for example, primer and top-coats), which may contain a fluorescent whitening agent, are applied to the cover. The resulting golf ball has a glossy and durable surface finish.

In another finishing process, the golf balls are painted with one or more paint coatings. For example, white primer paint may be applied first to the surface of the ball and then a white top-coat of paint may be applied over the primer. Of course, the golf ball may be painted with other colors, for example, red, blue, orange, and yellow. As noted above, markings such as trademarks and logos may be applied to the painted cover of the golf ball. Finally, a clear surface coating may be applied to the cover to provide a shiny appearance and protect any logos and other markings printed on the ball.

Different ball constructions can be made using the different core constructions of this invention as shown in FIGS. 1-15 discussed above. Such golf ball designs include, for example, three-piece, four-piece, five-piece, and six-piece designs. It should be understood that the core constructions and golf balls shown in FIGS. 1-15 are for illustrative purposes only and are not meant to be restrictive. Other core constructions and golf balls can be made in accordance with this invention.

For example, a multi-layered core structure having an inner core (center); intermediate core layer; and outer core layer can be made. A cover having a single or multiple layers may be disposed about the multi-layered core. The inner core layer may comprise a thermoset or thermoplastic composition containing metal filler as discussed above. The intermediate and outer core layers also may be made of thermoset or thermoplastic compositions. Each of the core layers may have a positive hardness gradient, and there may be a positive hardness gradient across the entire core assembly. In such a core construction, the specific gravity of the inner core ($SG_{inner}$) is preferably greater than the specific gravity of the intermediate core layer ($SG_{intermediate}$); and the $SG_{intermediate}$ is greater than the specific gravity of the outer core layer ($SG_{outer}$).

Test Methods

Hardness. The center hardness of a core is obtained according to the following procedure. The core is gently pressed into a hemispherical holder having an internal diameter approximately slightly smaller than the diameter of the core, such that the core is held in place in the hemispherical portion of the holder while concurrently leaving the geometric central plane of the core exposed. The core is secured in the holder by friction, such that it will not move during the cutting and grinding steps, but the friction is not so excessive that distortion of the natural shape of the core would result. The core is secured such that the parting line of the core is roughly parallel to the top of the holder. The diameter of the core is measured 90 degrees to this orientation prior to securing. A measurement is also made from the bottom of the holder to the top of the core to provide a reference point for future calculations. A rough cut is made slightly above the exposed geometric center of the core using a band saw or other appropriate cutting tool, making sure that the core does not move in the holder during this step. The remainder of the core, still in the holder, is secured to the base plate of a surface grinding machine. The exposed 'rough' surface is ground to a smooth, flat surface, revealing the geometric center of the core, which can be verified by measuring the height from the bottom of the holder to the exposed surface of the core, making sure that exactly half of the original height of the core, as measured above, has been removed to within 0.004 inches. Leaving the core in the holder, the center of the core is found with a center square and carefully marked and the hardness is measured at the center mark according to ASTM D-2240. Additional hardness measurements at any distance from the center of the core can then be made by drawing a line radially outward from the center mark, and measuring the hardness at any given distance along the line, typically in 2 mm increments from the center. The hardness at a particular distance from the center should be measured along at least two, preferably four, radial arms located 180° apart, or 90° apart, respectively, and then averaged. All hardness measurements performed on a plane passing through the geometric center are performed while the core is still in the holder and without having disturbed its orientation, such that the test surface is constantly parallel to the bottom of the holder, and thus also parallel to the properly aligned foot of the durometer.

The outer surface hardness of a golf ball layer is measured on the actual outer surface of the layer and is obtained from the average of a number of measurements taken from opposing hemispheres, taking care to avoid making measurements on the parting line of the core or on surface defects, such as holes or protrusions. Hardness measurements are made pursuant to ASTM D-2240 "Indentation Hardness of Rubber and Plastic by Means of a Durometer." Because of the curved surface, care must be taken to ensure that the golf ball or golf ball sub-assembly is centered under the durometer indenter before a surface hardness reading is obtained. A calibrated, digital durometer, capable of reading to 0.1 hardness units is used for the hardness measurements. The digital durometer must be attached to, and its foot made parallel to, the base of an automatic stand. The weight on the durometer and attack rate conforms to ASTM D-2240.

In certain embodiments, a point or plurality of points measured along the "positive" or "negative" gradients may be above or below a line fit through the gradient and its outermost and innermost hardness values. In an alternative preferred embodiment, the hardest point along a particular steep "positive" or "negative" gradient may be higher than the value at the innermost portion of the inner core (the geometric center) or outer core layer (the inner surface)—as long as the outermost point (i.e., the outer surface of the inner core) is greater than (for "positive") or lower than (for "negative") the innermost point (i.e., the geometric center of the inner core or the inner surface of the outer core layer), such that the "positive" and "negative" gradients remain intact.

As discussed above, the direction of the hardness gradient of a golf ball layer is defined by the difference in hardness measurements taken at the outer and inner surfaces of a particular layer. The center hardness of an inner core and hardness of the outer surface of an inner core in a single-core ball or outer core layer are readily determined according to the test procedures provided above. The outer surface of the inner core layer (or other optional intermediate core layers) in a dual-core ball are also readily determined according to the procedures given herein for measuring the outer surface hardness of a golf ball layer, if the measurement is made prior to surrounding the layer with an additional core layer. Once an additional core layer surrounds a layer of interest, the hardness of the inner and outer surfaces of any inner or intermediate layers can be difficult to determine. Therefore, for purposes of the present invention, when the hardness of the inner or outer surface of a core layer is needed after the inner layer has been surrounded with another core layer, the test procedure described above for measuring a point located 1 mm from an interface is used. Likewise, the midpoint of a core layer is taken at a point equidistant from the inner surface and outer surface of the layer to be measured, most typically an outer core layer. Once again, once one or more core layers surround a layer of interest, the exact midpoint may be difficult to determine, therefore, for the purposes of the present invention, the measurement of "midpoint" hardness of a layer is taken within plus or minus 1 mm of the measured midpoint of the layer.

Also, it should be understood that there is a fundamental difference between "material hardness" and "hardness as measured directly on a golf ball." For purposes of the present invention, material hardness is measured according to ASTM D2240 and generally involves measuring the hardness of a flat "slab" or "button" formed of the material. Surface hardness as measured directly on a golf ball (or other spherical surface) typically results in a different hardness value. The difference in "surface hardness" and "material hardness" values is due to several factors including, but not limited to, ball construction (that is, core type, number of cores and/or cover layers, and the like); ball (or sphere) diameter; and the material composition of adjacent layers. It also should be understood that the two measurement techniques are not linearly related and, therefore, one hardness value cannot easily be correlated to the other. Shore hardness (for example, Shore C or Shore D hardness) was measured according to the test method ASTM D-2240.

Compression. As disclosed in Jeff Dalton's Compression by Any Other Name, Science and Golf IV, Proceedings of the World Scientific Congress of Golf (Eric Thain ed., Routledge, 2002) ("J. Dalton"), several different methods can be used to measure compression, including Atti compression, Riehle compression, load/deflection measurements at a variety of fixed loads and offsets, and effective modulus. For purposes of the present invention, "compression" refers to Atti compression and is measured according to a known procedure, using an Atti compression test device, wherein a piston is used to compress a ball against a spring. The travel of the piston is fixed and the deflection of the spring is measured. The measurement of the deflection of the spring does not begin with its contact with the ball; rather, there is an offset of approximately the first 1.25 mm (0.05 inches) of the spring's deflection. Very low stiffness cores will not cause the spring to deflect by more than 1.25 mm and therefore have a zero compression measurement. The Atti compression tester is designed to measure objects having a diameter of 42.7 mm (1.68 inches); thus, smaller objects, such as golf ball cores, must be shimmed to a total height of 42.7 mm to obtain an accurate reading. Conversion from Atti compression to Riehle (cores), Riehle (balls), 100 kg deflection, 130-10 kg deflection or effective modulus can be carried out according to the formulas given in J. Dalton. Compression may be measured as described in McNamara et al., U.S. Pat. No. 7,777,871, the disclosure of which is hereby incorporated by reference.

Coefficient of Restitution ("COR"). The COR is determined according to a known procedure, wherein a golf ball or golf ball subassembly (for example, a golf ball core) is fired from an air cannon at two given velocities and a velocity of 125 ft/s is used for the calculations. Ballistic light screens are located between the air cannon and steel plate at a fixed distance to measure ball velocity. As the ball travels toward the steel plate, it activates each light screen and the ball's time period at each light screen is measured. This provides an incoming transit time period which is inversely proportional to the ball's incoming velocity. The ball makes impact with the steel plate and rebounds so it passes again through the light screens. As the rebounding ball activates each light screen, the ball's time period at each screen is measured. This provides an outgoing transit time period which is inversely proportional to the ball's outgoing velocity. The COR is then calculated as the ratio of the ball's outgoing transit time period to the ball's incoming transit time period (COR=$V_{out}/V_{in}=T_{in}/T_{out}$).

When numerical lower limits and numerical upper limits are set forth herein, it is contemplated that any combination of these values may be used. Other than in the operating examples, or unless otherwise expressly specified, all of the numerical ranges, amounts, values and percentages such as those for amounts of materials and others in the specification may be read as if prefaced by the word "about" even though the term "about" may not expressly appear with the value, amount or range. Accordingly, unless indicated to the contrary, the numerical parameters set forth in the specification and attached claims are approximations that may vary depending upon the desired properties sought to be obtained by the present invention.

All patents, publications, test procedures, and other references cited herein, including priority documents, are fully incorporated by reference to the extent such disclosure is not inconsistent with this invention and for all jurisdictions in which such incorporation is permitted. It is understood that the compositions, golf ball components, and finished golf balls described and illustrated herein represent only some embodiments of the invention. It is appreciated by those skilled in the art that various changes and additions can be made to compositions and products without departing from the spirit and scope of this invention. It is intended that all such embodiments be covered by the appended claims.

We claim:

1. A multi-layered golf ball, comprising;
   i) an inner core comprising a metal powder dispersed in a thermoset or thermoplastic polymeric matrix, the metal powder comprising particles having a weight average size in the range of about 10 µm to about 450 µm, the inner core having a center and outer surface, and a diameter in the range of about 0.100 to about 1.100 inches;
   ii) an outer core layer comprising a thermoset or thermoplastic material, the outer core layer being disposed about the inner core and having a thickness in the range of about 0.200 to about 0.800 inches, wherein the inner core has a specific gravity ($SG_{inner}$) and a center hardness ($H_{inner\ core\ center}$), and the outer core has a specific gravity ($SG_{outer}$) and an outer surface hardness (($H_{outer\ surface\ of\ OC}$), the $SG_{inner}$ being greater than the $SG_{outer}$, and the $H_{inner\ core\ center}$ being in the range of about 10 to about 80 Shore C and the $H_{outer\ surface\ of\ the\ OC}$ being in the range of about 65 to about 96 Shore C to provide a positive hardness gradient across the core assembly, the surface of the outer core having a surface pattern system comprising at least one band defined on the land surface, wherein the surface pattern system covers from about 5% to about 40% of the outer land surface, and wherein the width of the at least one band varies along its length, and wherein the at least one band comprises a raised bead; and
   iii) a cover having at least one layer disposed about the multi-layered core.

2. The golf ball of claim 1, wherein the metal powder is selected from the group consisting of copper, steel, brass, tungsten, titanium, aluminum, magnesium, molybdenum, cobalt, nickel, iron, lead, tin, bronze, silver, gold, and platinum, and oxides and alloys and combinations thereof.

3. The golf ball of claim 2, wherein the metal powder is selected from the group consisting of austenitic stainless steels, ferritic stainless steels, and martensitic stainless steels, and alloys thereof.

4. The golf ball of claim 1, wherein the metal powder comprises particles having a weight average size in the range of about 10 µm to about 100 µm.

5. The golf ball of claim 1, wherein the metal powder is elemental iron.

* * * * *